(12) United States Patent
Iwata et al.

(10) Patent No.: US 12,407,222 B2
(45) Date of Patent: Sep. 2, 2025

(54) ROTATING MACHINE

(71) Applicant: MINEBEA MITSUMI Inc., Nagano (JP)

(72) Inventors: Hitoshi Iwata, Nagano (JP); Michihiro Shimizu, Nagano (JP); Naoki Ohsawa, Nagano (JP); Toshiyuki Nishikata, Nagano (JP); Tsuyoshi Kano, Nagano (JP); Shoma Yamanishi, Nagano (JP); Yuta Amagi, Nagano (JP); Yuya Senda, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 290 days.

(21) Appl. No.: 18/042,638

(22) PCT Filed: Aug. 19, 2021

(86) PCT No.: PCT/JP2021/030431
§ 371 (c)(1),
(2) Date: Feb. 23, 2023

(87) PCT Pub. No.: WO2022/044970
PCT Pub. Date: Mar. 3, 2022

(65) Prior Publication Data
US 2023/0361653 A1    Nov. 9, 2023

(30) Foreign Application Priority Data
Aug. 28, 2020   (JP) ................................ 2020-145023

(51) Int. Cl.
*H02K 9/06*     (2006.01)
*H02K 5/173*    (2006.01)
(Continued)

(52) U.S. Cl.
CPC ............. *H02K 9/06* (2013.01); *H02K 5/1732* (2013.01); *H02K 5/207* (2021.01); *H02K 7/083* (2013.01); *H02K 2205/09* (2013.01)

(58) Field of Classification Search
CPC ........ H02K 9/06; H02K 5/207; H02K 5/1732; H02K 7/083; H02K 2205/09
See application file for complete search history.

(56) References Cited

U.S. PATENT DOCUMENTS

2005/0166351 A1* 8/2005 Cunningham ........... H02K 7/14
15/314

FOREIGN PATENT DOCUMENTS

| CN | 201590719 U | 9/2010 |
| CN | 209930055 U | 1/2020 |

(Continued)

OTHER PUBLICATIONS

International Search Report for corresponding International Application No. PCT/JP2021/030431 mailed Oct. 12, 2021.
(Continued)

*Primary Examiner* — Terrance L Kenerly
(74) *Attorney, Agent, or Firm* — Chrisman Gallo Tochtrop LLC

(57) ABSTRACT

Provided is a rotating device having excellent performance of cooling a heat generation source. Included are a shaft member, a rotating body having a tubular shape and rotatable about the shaft member, a bearing supporting the rotating body with respect to the shaft member, and a coupling member disposed between the bearing and the rotating body in a radial direction (cd). The coupling member includes a ventilation channel communicating with an inside and an outside of the rotating body.

15 Claims, 25 Drawing Sheets

(51) Int. Cl.
*H02K 5/20* (2006.01)
*H02K 7/08* (2006.01)

(56) References Cited

FOREIGN PATENT DOCUMENTS

| | | |
|---|---|---|
| JP | 2001-327123 A | 11/2001 |
| JP | 2005-102370 A | 4/2005 |

OTHER PUBLICATIONS

Written Opinion for corresponding International Application No. PCT/JP2021/030431 dated Oct. 12, 2021 and English translation.

* cited by examiner

ROTATING MACHINE

CROSS-REFERENCE TO RELATED APPLICATIONS

This application is a national stage entry of International Application No. PCT/JP2021/030431 filed on Aug. 19, 2021, which claims the benefit of priority to Japanese Application No. JP2020-145023, filed Aug. 28, 2020, the entire disclosures of which are hereby incorporated herein by reference.

TECHNICAL FIELD

The present invention relates to a rotating device.

BACKGROUND ART

Known various types of rotating devices have been developed, manufactured, and used in accordance with various applications and required performance. In this context, there is a demand for improving a fundamental performance for a rotating device, such as high speed rotation, and a demand for further size reduction of the entire device, and achieving both the demands at a higher level is awaited.

On the other hand, the high speed rotation causes a coil and a stator core to be more likely to have higher temperature. Thus, there is a need to cool the stator including the heat generation source, such as the coil and the stator core.

CITATION LIST

Patent Literature

Patent Literature 1: JP 2005-102370 A

SUMMARY OF INVENTION

Technical Problem

Thus, an example of an object of the present invention is to provide a rotating device having excellent performance of cooling a heat generation source.

Solution to Problem

The above problem is solved by the present invention described below. That is, a rotating device of the present invention includes a shaft member, a rotating body having a tubular shape and rotatable about the shaft member, a bearing supporting the rotating body with respect to the shaft member, and a coupling member disposed between the bearing and the rotating body in a radial direction. The coupling member includes a ventilation channel communicating with an inside and an outside of the rotating body.

The rotating device of the present invention may include a housing having a tubular shape surrounding the rotating body and a stator inside the rotating body.

In the rotating device of the present invention, the coupling member may include a plurality of blades, and the plurality of blades may be oriented in a direction inclined with respect to an axial direction of the shaft member.

In this case, each bearing may be provided at or near a corresponding end part of the rotating body in the axial direction of the shaft member, the coupling member may be disposed between each bearing and the rotating body, and one of each coupling member may include the blades.

In this case, preferably, a gas can flow inside the rotating body in the axial direction, and at least the coupling member at a discharge port side of the gas includes the blades.

The other of each coupling member may include a plurality of spokes extending inward and outward in the radial direction.

Alternatively, the rotating device of the present invention may include a blade member adjacent to the coupling member in an axial direction and including a plurality of blades, and the blade of the blade member may be inclined.

In this case, the blade of the blade member may be oriented in a direction inclined with respect to an axial direction of the shaft member. Further, the coupling member may include a plurality of spokes extending inward and outward in the radial direction.

In this case, the blade member may include a projecting part projecting toward a side of the coupling member, and the projecting part may fit into the coupling member.

In this case, each bearing may be provided at or near a corresponding end part of the rotating body in an axial direction of the rotating body, the coupling member may be disposed between each bearing and the rotating body, and the blade member may be provided at an outer side of one of each coupling member in the axial direction of the rotating body.

In this case, preferably a gas can flow inside the rotating body in the axial direction, and the blade member is provided at an outer side of the coupling member at a discharge port side of the gas in the axial direction of the rotating body.

Further, the rotating device of the present invention may include a blade member adjacent to the coupling member in an axial direction and including a plurality of blades. The blade member may include a ventilation channel connected to the ventilation channel of the coupling member, and a gas may flow inside the rotating body in both directions of axial direction.

In this case, the coupling member may include a base opposing the blade of the blade member in an axial direction of the shaft member, and a hole part serving as the ventilation channel may be formed in the base.

In the rotating device of the present invention, a rotor blade may be provided at an outer peripheral surface of the rotating body.

In this case, the rotor blade may include a plurality of blades each including a plurality of blade parts lined in the axial direction of the rotating body, and each of the plurality of blades of the rotor blade may oppose a blade adjacent to each of the plurality of blades of the rotor blade in a circumferential direction of the rotating body. An end part of each of the plurality of blades of the rotor blade may be positioned between both end parts of the blade adjacent to each of the plurality of blades of the rotor blade in the circumferential direction of the rotating body.

DESCRIPTION OF EMBODIMENTS

Rotating devices according to embodiments of the present invention will be described below with reference to the drawings. In the following embodiments, the rotating devices will be described with an example of a so-called blower (or intake device) configured to generate wind for the purpose of blowing (or intaking) air.

First Embodiment

Figure 1:
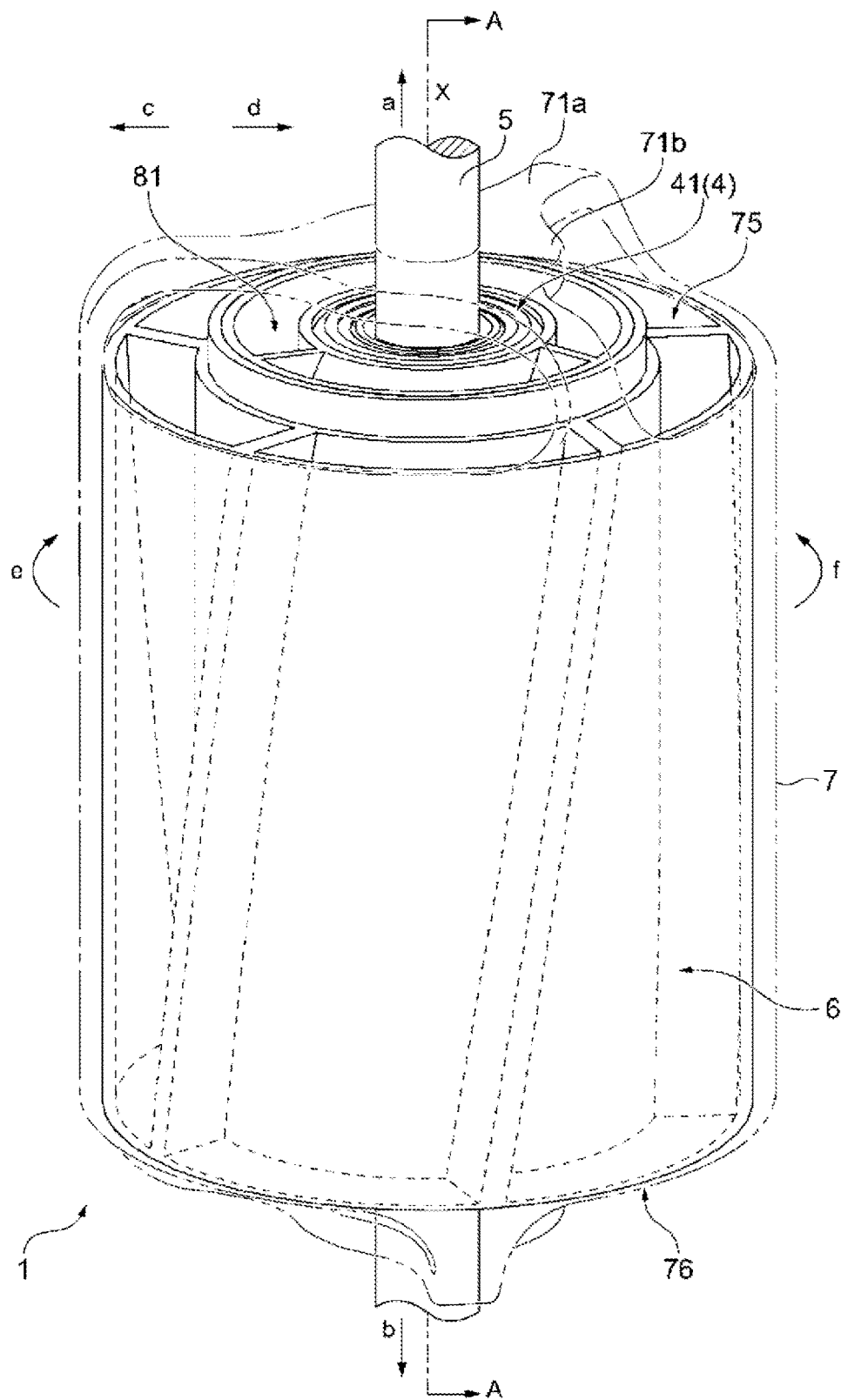
FIG. 1 is a transparent perspective view of a rotating device according to a first embodiment as one example of the present invention.
Figure 2:
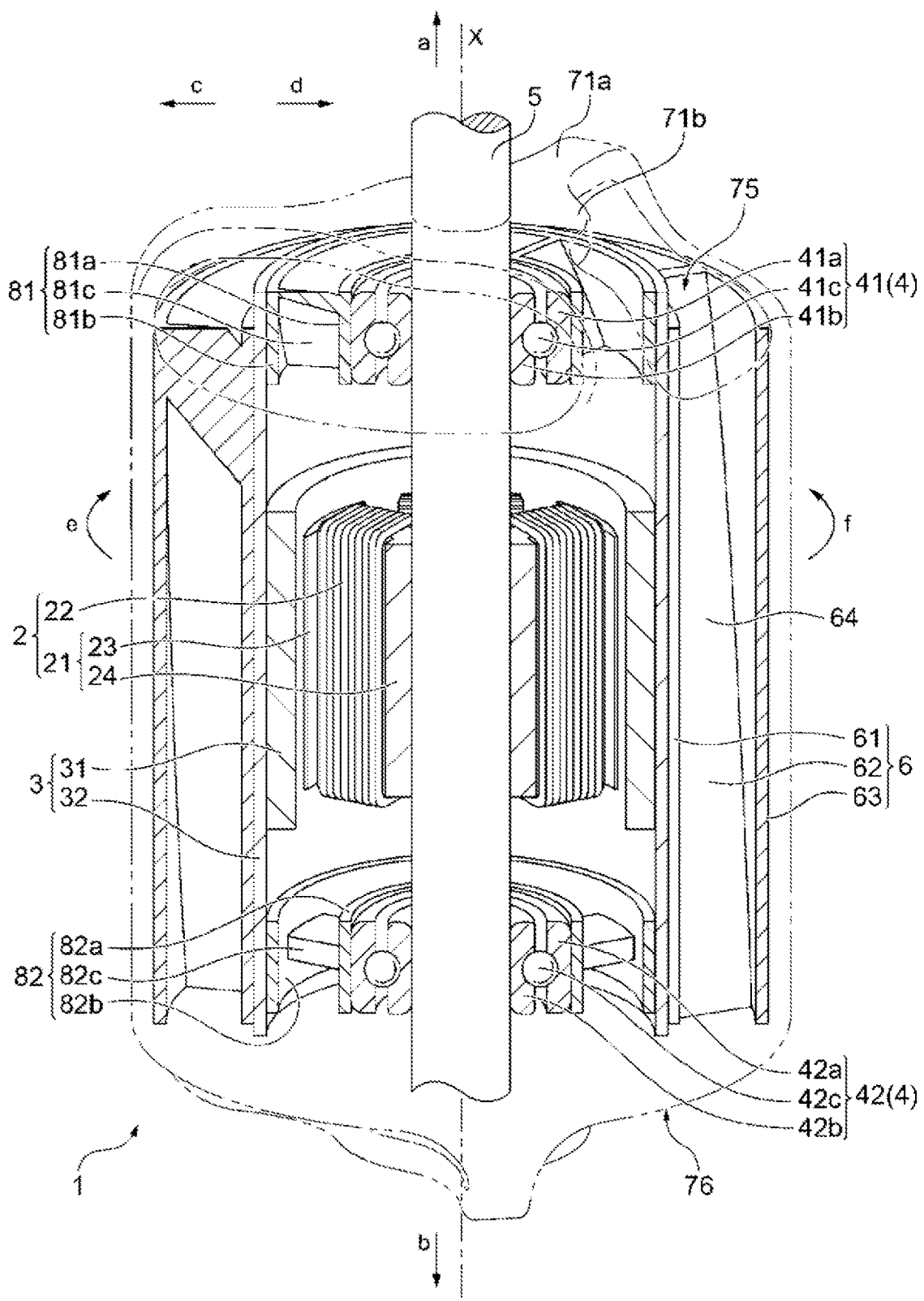
FIG. 2 is a transparent cross-sectional view taken along a cross section A-A in FIG. 1, including an axial line x of the rotating device according to the first embodiment as one example of the present invention.

FIG. 1 is a cross-sectional view of a rotating device 1 according to a first embodiment as one example of the present invention, and FIG. 2 is a transparent cross-sectional view taken along a cross section (cross-section A-A in FIG. 1), including an axial line x of the rotating device 1. FIGS. 1 and 2 illustrates a housing 7 in a transparent state by being drawn with imaginary lines (chain double-dashed lines).

In the description of the first embodiment and a second embodiment described below, "upper" or "lower" refers to a vertically structured relationship in FIGS. 1 and 2, and do not necessarily match a vertically structured relationship in the direction of gravity.

In the axial line x direction (hereinafter also referred to as the "axial direction"), an arrow a direction is referred to as an upper side a, and an arrow b direction is referred to as a lower side b. Further, in a direction perpendicular to the axial line x (hereinafter also referred to as a "radial direction"), a direction away from the axial line x (arrow c direction) is referred to as an outer peripheral side c, a direction toward the axial line x (arrow d direction) is referred to as an inner peripheral side d, and both directions are referred to as radial directions cd. A clockwise direction in a circumferential direction (circumferential direction viewed from the upper side a) about the axial line x is referred to as a circumferential direction e, and a counterclockwise direction in the circumferential direction is referred to as a circumferential direction f. The arrows a to f indicating these directions and x indicating the axial line are similarly applied to the description of the second embodiment described below.

In addition, in the description of the present embodiment, in the rotating device 1, a part rotating may be referred to as a "rotating side", and a part supporting a member at the rotating side and fixed without rotating may be referred to as a "fixed side". Since the part fixed without rotating is relatively stationary with respect to the part rotating, the part fixed without rotating may be referred to as a stationary part. These terms are similarly applied to the description of the second embodiment described below.

The rotating device 1 of the present embodiment is an outer-rotor type rotating device including a shaft member 5, a rotor 3 as a rotating body having a tubular shape and rotatable about the shaft member 5, the housing 7 having a tubular shape and surrounding the rotor 3, a bearing 4 rotatably supporting the rotor 3 about the shaft member 5, a coupling member 81, 82 disposed between the rotor 3 and the bearing 4 and coupling the rotor 3 with the bearing 4, a stator 2 inside the rotor 3, and a plurality of rotor blades 6 provided on the rotor 3.

The stator 2 includes a stator core 21 and a coil 22. The stator core 21 is fixed to the shaft member 5 and includes a plurality of magnetic pole parts 23 extending radially toward the outer peripheral side from the shaft member 5 as an axis. The coil 22 is wound around the magnetic pole parts 23. The illustrated stator 2 is disposed in the housing 7 so that a gap between a first bearing 41 and the stator 2 is equal to a gap between a second bearing 42 and the stator 2.

The stator core 21 includes an annular part 24 and the plurality of magnetic pole parts 23. The annular part 24 is a stacked body formed by stacking magnetic bodies such as silicon steel plates and is disposed coaxially surrounding the shaft member 5. The plurality of magnetic pole parts 23 is formed extending radially toward the outer peripheral side in the radial direction from the annular part 24.

The rotor 3 includes a magnet 31 and a tubular member 32. The magnet 31 opposes the magnetic pole parts 23 at the outer peripheral side of the stator 2. The tubular member 32 has a tubular shape. The magnet 31 is disposed at an inner peripheral surface of the tubular member 32. The tubular member 32 has a cylindrical shape centered at an axis of the shaft member 5 and surrounds the stator 2. The tubular member 32 also has a function of preventing leakage of a magnetic field from an interior of the tubular member 32 and is formed of a magnetic material. Note that the tubular member 32 may be formed of a non-magnetic material such as aluminum or plastic, for example, as long as there is no problem with the characteristics of the tubular member 32.

The magnet 31 is attached to the inner peripheral surface of the tubular member 32 so as to oppose the stator 2. The magnet 31 has an annular shape, and is provided with a region magnetized to the north pole and a region magnetized to the south pole alternately at a regular cycle (or at regular intervals) along a circumferential direction. The magnet 31 may be an annular integrally molded article; however, a plurality of magnets may be attached in a row to the inner peripheral surface of the tubular member 32 and arranged in a tubular shape.

The bearings 4 are disposed at both sides of the stator 2 in the axial direction of the shaft member 5 and includes two bearings, the first bearing 41 positioned at the upper side a and the second bearing 42 positioned at the lower side b. In other words, the magnet 31 and the stator 2 are positioned between the first bearing 41 and the second bearing 42 in the axial direction of the shaft member 5. The first bearing 41 and the second bearing 42 are members having the same configuration (same shape, structure, size, and material).

The first bearing 41 is a so-called ball bearing including an outer ring 41a, an inner ring 41b, and bearing balls 41c interposed between the outer ring 41a and the inner ring 41b. The bearing balls 41c roll between the outer ring 41a and the inner ring 41b, significantly reducing a rotational resistance of the outer ring 41a with respect to the inner ring 41b. The first bearing 41 is formed, for example, of a hard metal such as iron, or a ceramic in consideration of its function. The same applies to the second bearing 42.

Figure 3:
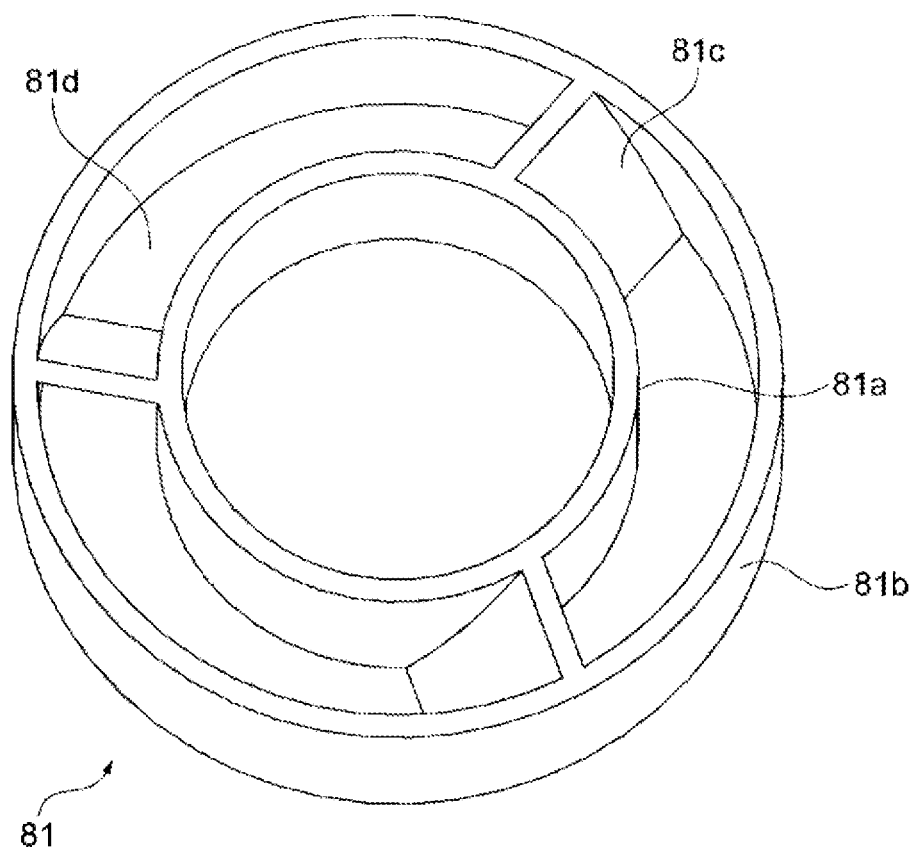
FIG. 3 is an enlarged perspective view of only a coupling member (inner impeller) including blades extracted from the rotating device according to the first embodiment as one example of the present invention.

The coupling member (hereinafter referred to as "inner impeller") 81 is disposed between the outer ring 41a of the first bearing 41 and the inner peripheral surface of an end part of the tubular member 32 at the upper side a. FIG. 3 illustrates an enlarged perspective view of only the inner impeller 81 extracted. As illustrated in FIG. 3, the inner impeller 81 includes a ring part (hereinafter referred to as "inner ring part") 81a at an inner side, a ring part (hereinafter referred to as "outer ring part") 81b at an outer side, and a plurality of (three in the present embodiment) blades 81c connecting an area between the inner ring part 81a and the outer ring part 81b.

In the inner impeller 81, a gas can pass between the inner ring part 81a and the outer ring part 81b, excluding positions of the blades 81c. That is, the inner impeller 81 includes a ventilation channel 81d.

The inner impeller 81 may be molded with any material such as a resin, aluminum, or other metals but is preferably molded with a resin from the perspectives of weight reduction, low cost, and moldability.

As illustrated in FIG. 3, a plurality of blades 81c is oriented in a direction inclined with respect to the axial line x direction (axial direction of the shaft member 5). The three blades 81c are inclined at the same angle. Therefore, the inner impeller 81 functions as a so-called fan for generating a flow of a gas in the axial line x direction by rotating.

Figure 4:
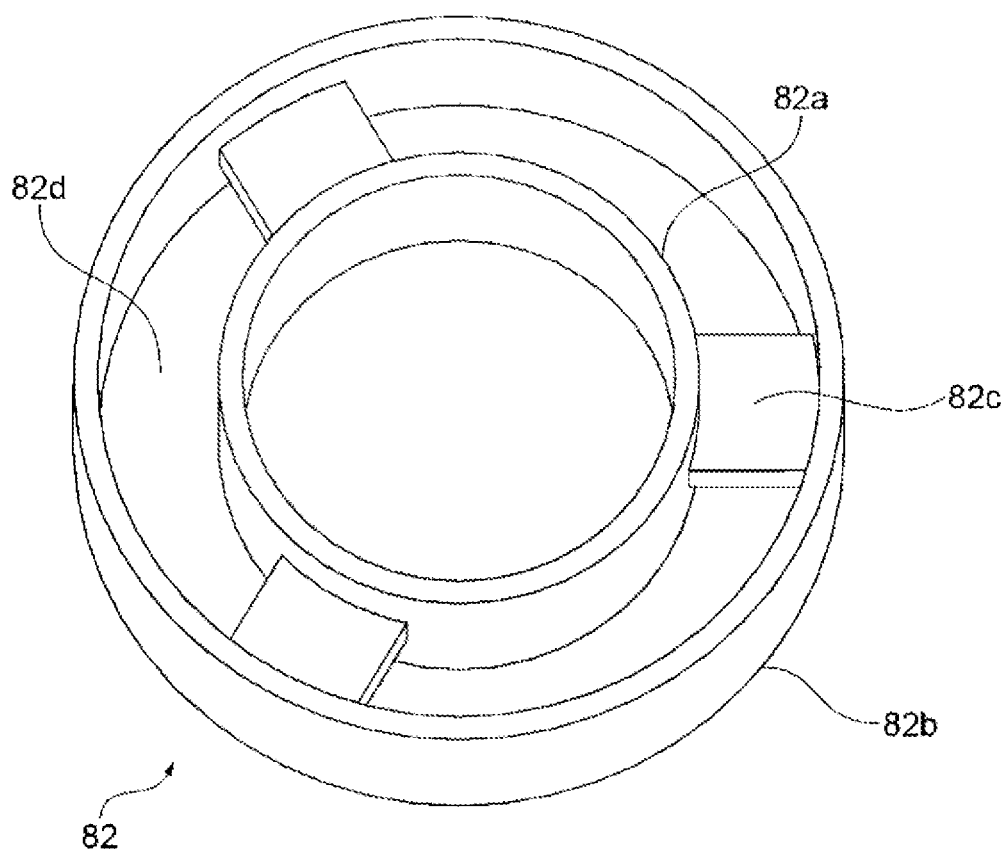
FIG. 4 is an enlarged perspective view of only a coupling member (spacer) including spokes extracted from the rotating device according to the first embodiment as one example of the present invention.

On the other hand, the coupling member (hereinafter referred to as "spacer") 82 is disposed between an outer ring 42a of the second bearing 42 and the inner peripheral surface of an end part of the tubular member 32 at the lower side b. FIG. 4 illustrates an enlarged perspective view of only the spacer 82 extracted. As illustrated in FIG. 4, the spacer 82 includes a ring part (hereinafter referred to as "inner ring part") 82a at an inner side, a ring part (hereinafter referred to as "outer ring part") 82b at an outer side, and a plurality of (three in the present embodiment) spokes 82c connecting an area between the inner ring part 82a and the outer ring part 82b.

The spacer 82 forms a ventilation channel 82d enabling the passage of a gas at positions excluding positions of the spokes 82c between the inner ring part 82a and the outer ring part 82b.

The spacer 82 may be molded with any material such as a resin or aluminum or other metal, but is preferably molded with a resin from the perspectives of weight reduction, low cost, and moldability.

As illustrated in FIG. 4, a plurality of spokes 82c in the spacer 82 has a side surface (plate surface) facing toward the stator 2 not inclined with respect to the axial line x direction, unlike the plurality of blades 81c of the inner impeller 81.

An inner peripheral surface of the inner ring part 81a of the inner impeller 81 is fixed to an outer peripheral surface of the outer ring 41a of the first bearing 41. On the other hand, an inner peripheral surface of the inner ring part 82a of the spacer 82 is fixed to an outer peripheral surface of the outer ring 42a of the second bearing 42. The fixing of the inner peripheral surfaces of the inner ring parts 81a, 82a and the outer peripheral surfaces of the outer rings 41a, 42a is not particularly limited, and may be performed by any known method, such as, for example, press-fitting, interference-fitting, fixing with an adhesive, or engagement, or a combination of a plurality of these fixing means (fixing elements).

Figure 5:
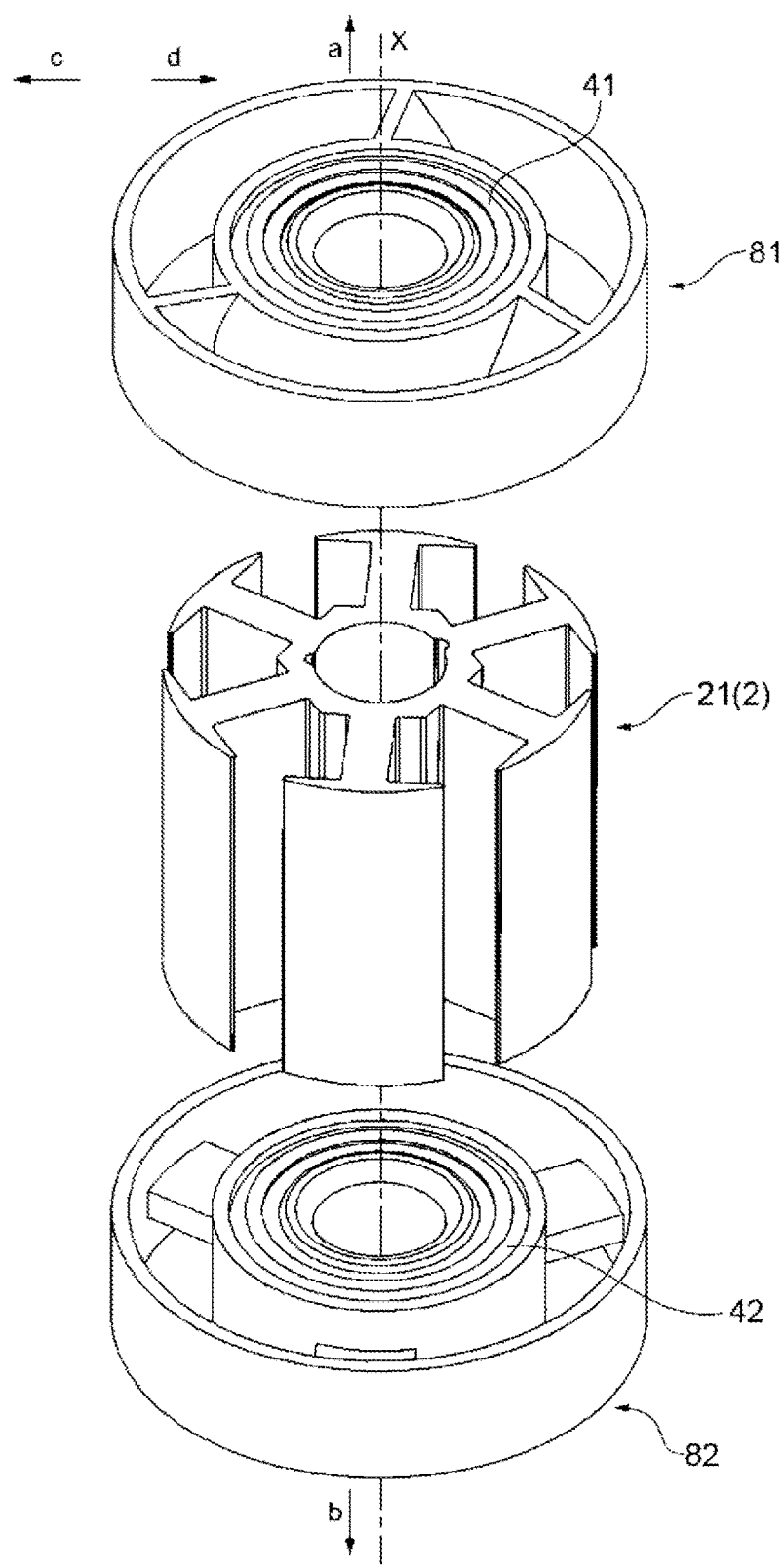
FIG. 5 is an exploded perspective view of only a stator core, a bearing, the inner impeller, and the spacer extracted from the rotating device according to the first embodiment as one example of the present invention.

FIG. 5 illustrates an exploded perspective view of only the stator core 21, the bearing 4, the inner impeller 81, and the spacer 82 of the rotating device 1 according to the present embodiment extracted.

The inner ring part 81a of the inner impeller 81 is fixed to the outer ring 41a of the first bearing 41. The inner ring part 82a of the spacer 82 is fixed to the outer ring 42a of the second bearing 42.

In FIG. 5, only the stator core 21 without illustration of the coil 22 is depicted; however, actually the stator 2 with the coil 22 wound around the magnetic pole parts 23 of the stator core 21 is prepared.

As illustrated in FIG. 5, the shaft member 5 is inserted and fitted into the center axis x in the order of an assembly of the first bearing 41 and the inner impeller 81, the stator 2, and the second bearing 42 and the spacer 82.

The inner ring 41b of the first bearing 41 and the inner ring 42b of the second bearing 42 are loosely fitted to the shaft member 5, and then fixed by an adhesive. Thus, a gap between the inner ring 41b and the shaft member 5, and a gap between the inner ring 42b and the shaft member 5 are filled with the adhesive. Alternatively, the inner ring 41b of the first bearing 41 and the inner ring 42b of the second bearing 42 may be press-fitted and fixed to the shaft member 5.

Thus, the inner ring 41b of the first bearing 41 and the inner ring 42b of the second bearing are fixed with respect to the shaft member 5 and serve as stationary parts together with the shaft member 5. Here, the shaft member 5 and the housing 7 are members stationary with respect to (relative to) the rotor 3. Thus, these are collectively referred to as a stationary member (stationary part).

On the other hand, an outer peripheral surface of the outer ring part 81b of the inner impeller 81 is fixed to the inner peripheral surface of the end part of the tubular member 32 at the upper side a. An outer peripheral surface of the outer ring part 82b of the spacer 82 is fixed to the inner peripheral surface of the end part of the tubular member 32 at the lower side b. The fixing of the outer peripheral surfaces of the outer ring parts 81b, 82b and the inner peripheral surface of the tubular member 32 is also not particularly limited, and may be performed by any known method, such as, for example, press-fitting, interference-fitting, fixing with an adhesive, or engagement, or a combination of a plurality of these fixing means (fixing elements).

Accordingly, the inner ring 41b of the first bearing 41 and the inner ring 42b of the second bearing 42 are fixed to an outer peripheral surface of the shaft member 5, and the outer ring 41a of the first bearing 41 and the outer ring 42a of the second bearing 42 are fixed to the inner peripheral surface at both ends of the tubular member 32 with the inner impeller 81 and the spacer 82 interposed between the outer rings 41a, 42a and the inner peripheral surface of the tubular member 32. As described above, the rotor 3 is configured to be rotatable about the axial line x of the shaft member 5 as a center axis.

The shaft member 5 is formed of aluminum, for example, into a hollow state (more specifically, a cylindrical state) for weight reduction. In the present embodiment, the shaft member 5 is a member at the fixed side. Since the member has a function of supporting the stator 2, the rotor 3, the bearing 4, and the rotor blades 6 with respect to the housing 7, it is necessary to have rigidity corresponding to the function.

An opening (not illustrated) is provided at the middle (intermediate part) of the shaft member 5, and a lead wire (not illustrated) connected to the coil 22 is drawn from the opening into a cavity within the shaft member 5, and is pulled out of the rotating device 1 from an end part opening (not illustrated) of the shaft member 5.

In the rotating device 1 according to the present embodiment, the first bearing 41 and the second bear 42 as well as the inner impeller 81 and the spacer 82 are present at both end parts of the tubular member 32, and an interior space is isolated. Power needs to be supplied to the coil 22 of the stator 2 in this isolated interior space of the tubular member 32. Note that "isolated" here refers to a state of seemingly no location where the lead wire for supplying power can be routed from the outside to the inside.

In the rotating device 1 according to the present embodiment, passing the lead wire through the cavity within the shaft member 5 electrically connects the inside of the isolated internal space of the tubular member 32 to the outside of the internal space. Therefore, the lead wire can power the coil 22 of the stator 2 in the interior space of the tubular member 32.

Of the plurality of components included in the rotating device 1 configured as described above, a portion of the components (stator 2, rotor 3, bearing 4, inner impeller 81, spacer 82, and shaft member 5) form a rotational mechanism. This rotational mechanisms rotates the rotor blades. With regard to this portion of components, the rotor 3 surrounding the stator 2 is rotatable with respect to the stator 2 fixed to the shaft member 5 and constitutes a so-called outer-rotor type brushless motor. In a typical outer-rotor type brushless motor, a shaft member fixed to a rotor rotates and the shaft member extracts a rotational force, whereas in the rotating device 1 according to the present embodiment, the shaft member 5 is a member at the fixed side, and is configured so that the rotational force is directly extracted from the rotor 3.

The housing 7 is a member having a cylindrical shape, and is formed of a plastic or a metal, for example. Although not illustrated, both ends in the axial direction of the housing 7 are openings (hereinafter, an opening at the upper side a is referred to as an "upper end opening" and an opening at the lower side b is referred to as a "lower end opening").

A portion of the components of the rotating device 1 are accommodated in an interior of the housing 7, and the shaft member 5 is fixed to an upper end part and a lower end part of the housing 7. The upper end part and the lower end part of the housing 7 each include three spoke parts 71a connected from a tubular main body part (tubular part 72) of the housing 7, and a disk part 71b coupled to the spoke parts 71a, and the shaft member 5 is fixed to the disk part 71b.

The housing 7 and the shaft member 5 constitute members at the fixed side. An upper end opening 75 and a lower end opening 76 are provided at the upper end part and the lower end part of the housing 7, and the upper end opening 75 and the lower end opening 76 each surround the disk part 71b and shaft member 5.

The rotor blades 6 are attached to the outer peripheral surface of the tubular member 32 of the rotor 3, across substantially the entire axial direction (axial line x direction) of the tubular member 32. The rotor blade 6 will now be described with reference to FIGS. 6 and 7.

Figure 6:
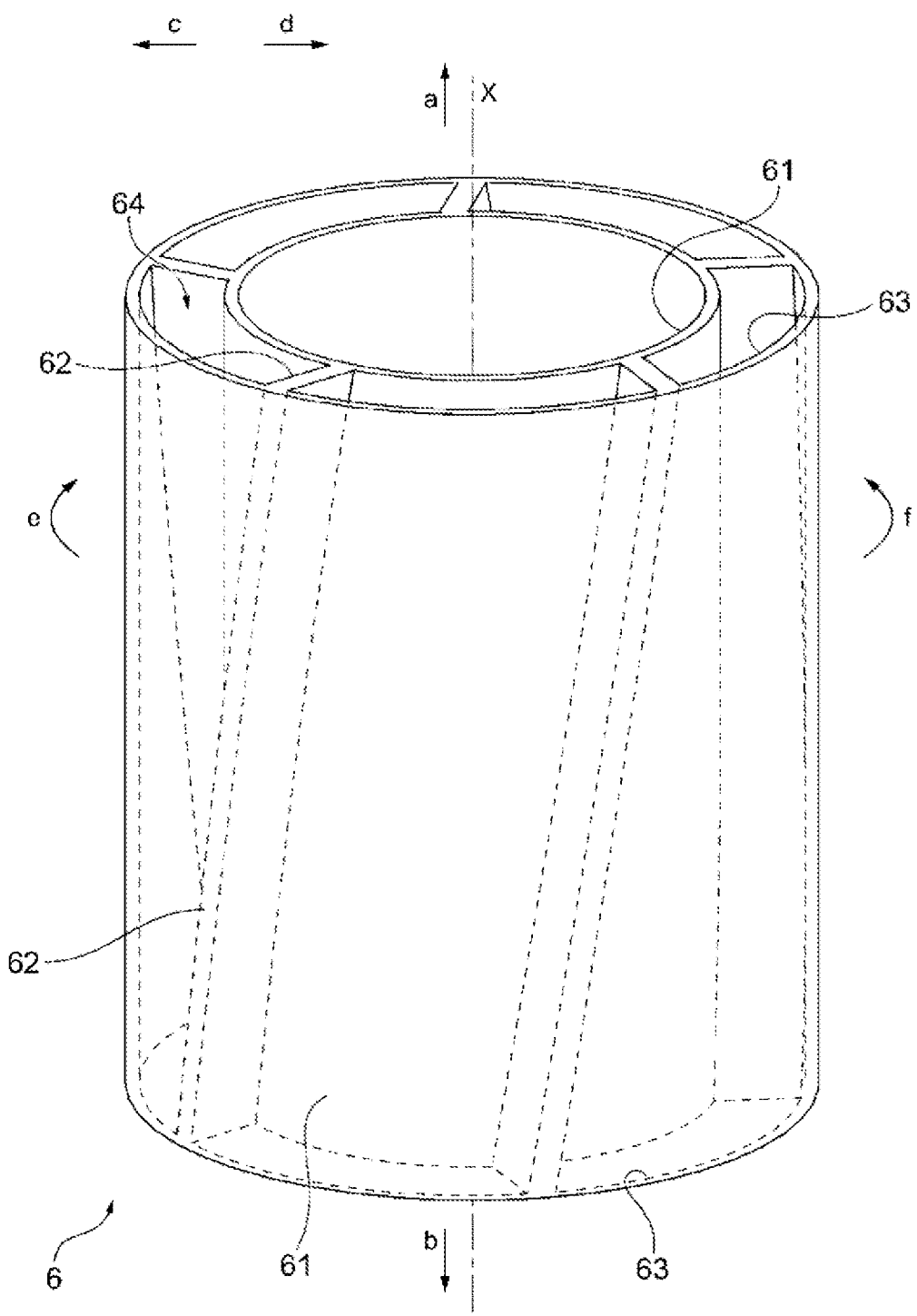
FIG. 6 is a perspective view of only a rotor blade extracted from the rotating device according to the first embodiment as one example of the present invention.
Figure 7:
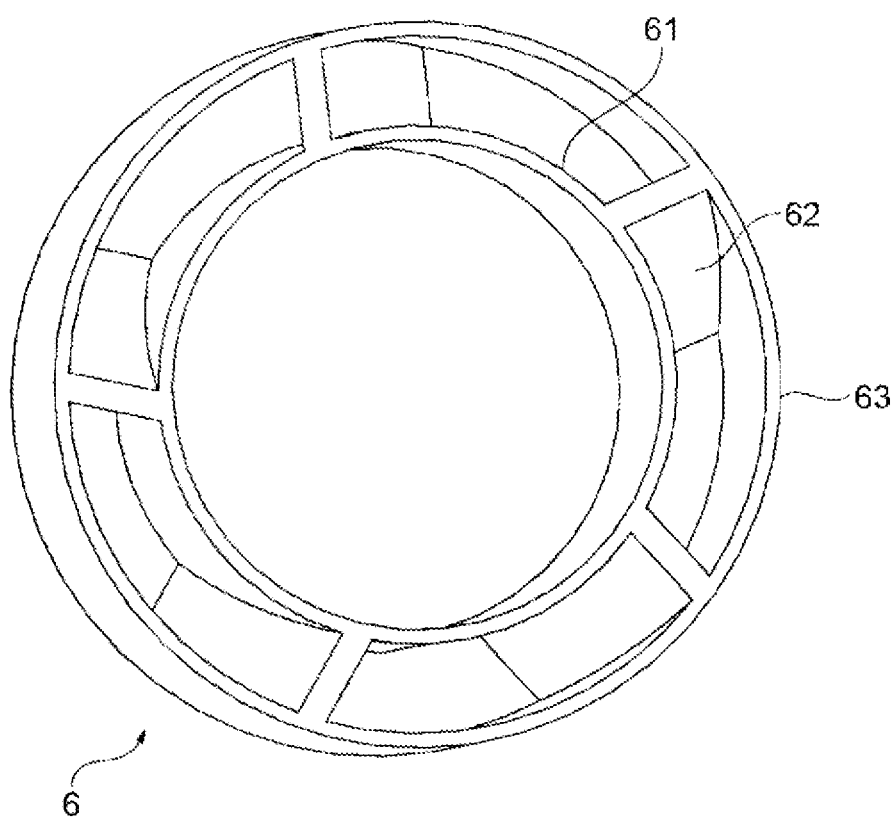
FIG. 7 is an enlarged perspective view, as viewed from near an upper side a in an axial direction, extracting only the rotor blade from the rotating device according to the first embodiment as one example of the present invention.

FIG. 6 is a perspective view of only the rotor blade 6 extracted from the rotating device 1 according to the present invention, and FIG. 7 is a perspective view of the rotor blade 6, as viewed from near the upper side a in the axial direction.

The rotor blade 6 includes an inner tube 61 attached to the outer peripheral surface of the tubular member 32, an outer tube 63 spaced apart from and opposing an inner peripheral surface of the housing 7, and a plurality of (five in the present embodiment) blades 62 disposed between the inner tube 61 and the outer tube 63. A cavity 64 is formed between the inner tube 61 and the outer tube 63, and the blades 62 disposed in the cavity couple the inner tube 61 with the outer tube 63. Accordingly, the integrated rotor blade 6 is formed by the inner tube 61, the blades 62, and the outer tube 63.

The blades 62 are oriented in a direction inclined with respect to the axial line x direction of the shaft member 5.

The five blades 62 are equally spaced apart in the circumferential directions of and inclined at the same angle.

The rotor blade 6 is attached to the outer peripheral surface of the tubular member 32 by fitting the tubular member 32 of the rotor 3 into an inner peripheral part (inner hole) of the inner tube 61, and fixing the tubular member 32 in a predetermined position by an adhesive or the like. Accordingly, the rotor blade 6 rotates in the housing 7 as the rotor 3 rotates.

The rotor blade 6 rotates in accordance with the rotation of the rotor 3 and thus rotates together with the rotor 3, generating a flow of a gas in the axial line x direction in accordance with the rotation of the rotor blade 6. This flow of air occurs in either an upward direction or a downward direction of the axial direction of the shaft member 5 in the cavity 64 between the inner tube 61 and the outer tube 63. In the rotating device 1 according to the present embodiment, the rotating device 1 is configured to be driven to rotate the rotor blades 6 in the clockwise circumferential direction e, causing the air taken in from the lower end opening 76 to pass through the cavity 64 and be blown out from the upper end opening 75.

The rotating device 1 according to the present embodiment is provided with the rotor blades 6 at an outer peripheral surface of the rotor 3 serving as a rotating body and is provided with the housing 7 having a tubular shape so as to surround the rotor blades 6, and thus one of both end openings of the housing 7 is a suction port and the other is a discharge port, and the rotating mechanism (portion of the plurality of components of the rotating device 1) rotating the rotor blades and the rotor blades 6 can be accommodated in the internal space of the housing 7. One of the inner impeller 81 and the spacer 82 can be the suction port and the other can be the discharge port. In particular, because the rotor blades 6 are positioned in a flow channel (also referred to as a wind passage) where air flows, space can be saved and size reduction of the entire rotating device can be achieved.

In the rotating device 1 according to the present embodiment, the space communicating with the lower end opening 76 from the upper end opening 75 is a cavity so as not to inhibit the flow of air due to members other than the spoke parts 71a. Furthermore, because the space has a straight tubular shape except for the space occupied by the cylindrical motor, air can flow straight. Thus, air can be fed out straight from the upper end opening toward the lower end opening by rotating the rotor blades 6. Thus, according to the rotating device 1 according to the present embodiment, air can be efficiently fed out, and a supply of strong wind and large wind volume (large suction volume) can be achieved.

In a rotating device according to a configuration of a conventional motor with a rotating shaft member projecting from the motor, the rotating shaft member rotates with a side of the rotating shaft member being supported, and the rotational force is extracted from the projecting other end side. This easily causes deviation of rotation; however, in the rotating device 1 according to the present embodiment, the rotor 3 itself supported by the bearing 4 rotates as the rotating body, stabilizing the rotation of the rotor 3.

In the rotating device 1 according to the present embodiment, because the first bearing 41 and the second bearing 42 are fixed respectively to both end parts of the rotor 3, and the rotor 3 serving as the rotating body is supported, the rotation of the rotor 3 is stabilized with respect to the shaft member 5. In particular, because the magnet 31 as a component of the rotor 3 serving as the rotating body and having a predetermined weight is disposed between the first bearing 41 and the second bearing 42 rotatably supporting the rotor 3 in the axial direction of the shaft member 5, the balance in the axial direction is improved and the rotation of the rotor 3 is stabilized.

Although the positions of the bearings are more preferably at both end parts of a rotating body as in the present embodiment, positions near both the end parts of the rotating body also makes the rotation of the rotating body with respect to the shaft member sufficiently stable. "Near" used herein refers to a position close to one of both end parts of the rotating body, between both end parts and a center part of the rotating body, and cannot be expressly defined by a numerical value. For example, a region within a length of 20% from one of both ends in the axial direction of the rotating body, or preferably, a region within a length of 10% from one of both the ends is included in the concept of "near both end parts".

In the rotating device 1 according to the present embodiment, the first bearing 41 and the second bearing 42 are members having the same configuration, improving a balance in the axial direction between rotating portions including the outer rings 41a, 42a as parts of the bearing 4 and the rotor 3. That is, in the rotating device 1 according to the present embodiment, the balance in the axial direction of the entire rotating device 1 is improved, stabilizing the rotation of the rotor 3 from this perspective as well.

As described above, in the rotating device 1 according to the present embodiment, size reduction of the entire rotating device can be realized, deviation of rotation of the rotor 3 is unlikely to occur, and high precision stabilization can be achieved.

The stabilization of the rotation of the rotor 3 means that uneven rotation is less likely to occur, and thus the rotating device 1 can achieve high rotation and high torque. That is, according to the rotating device 1 according to the present embodiment, a device having excellent characteristics as a rotating device while achieving size reduction can be provided.

In the present embodiment, an example of a configuration with both upper and lower end parts of the shaft member 5 fixed to the housing 7 is given; however, it is sufficient that at least one end part or a portion of the shaft member 5 be fixed to the housing, as long as the shaft member 5 at the fixed side is fixed to the housing 7 in some manner.

As described above, the rotating device 1 of the present embodiment can realize high performance with a small size. However, because of the high performance, the coil 22 and the stator core 21 are more likely to become higher in temperature due to an increased speed of rotation, for example. This makes it necessary to cool the stator 2 including the heat generation source such as the coil 22 and the stator core 21; however, ensuring sufficient cooling just by providing a ventilation port for cooling in the tubular member 32 may be difficult. In the first place, it is difficult to secure a space for the ventilation port. When a ventilation port is provided in the tubular member 32 to cool the stator 2, the location for the ventilation port must be secured, sometimes hindering size reduction of the rotating device 1.

In contrast, in the present embodiment, the coupling members (inner impeller 81 and spacer 82) including the ventilation channel communicating with the inside and the outside of the rotor 3 are disposed between the bearing 4 and the rotor 3, thereby achieving efficient cooling of the stator 2.

Figure 8:
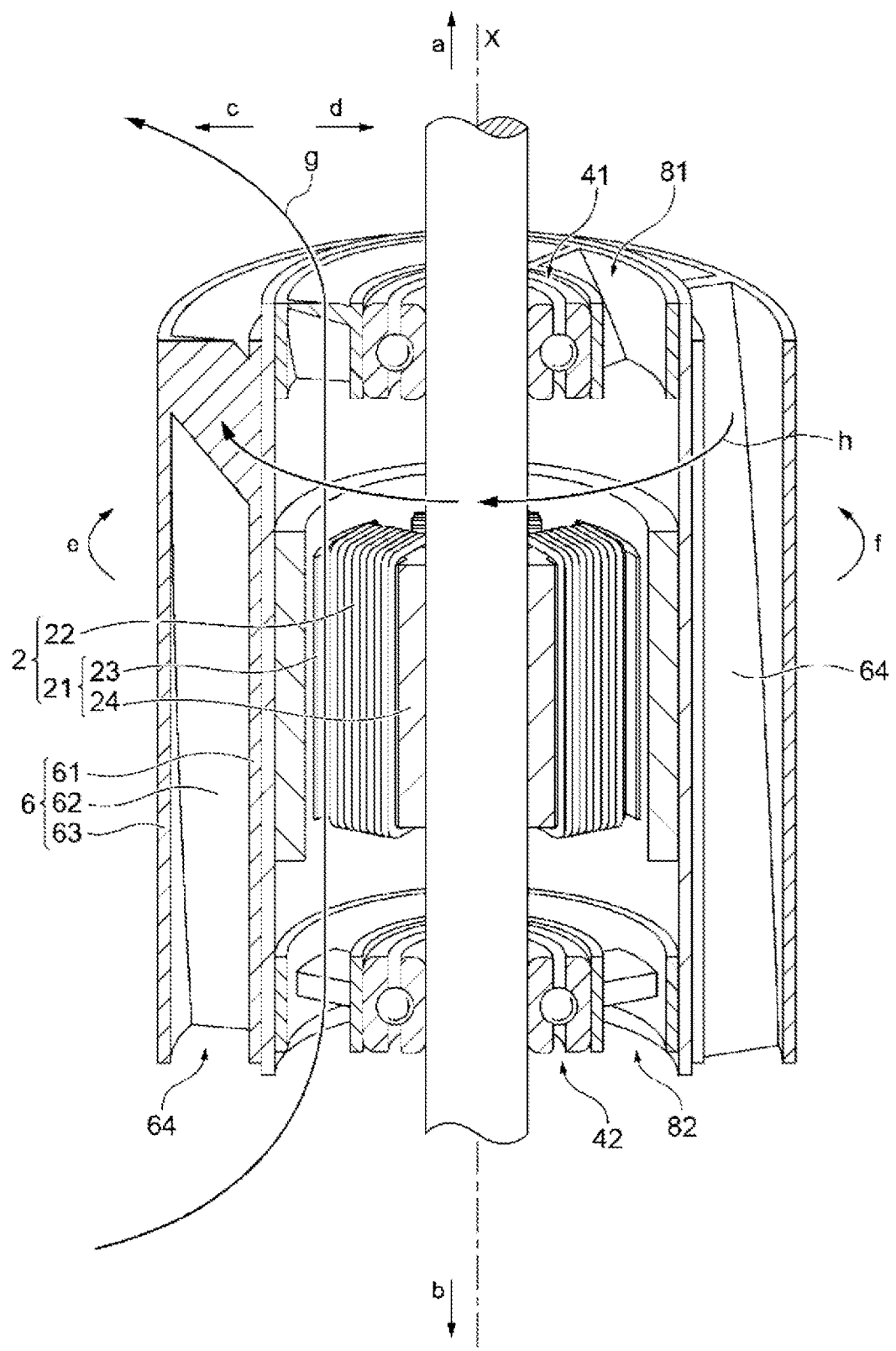
FIG. 8 is an explanatory diagram for describing a flow of a gas for cooling an inside of a rotor of the rotating device according to the first embodiment as one example of the present invention.

FIG. 8 illustrates an explanatory diagram for describing a flow of a gas for cooling the inside of the rotor 3 of the rotating device 1 according to the present embodiment. Note that, in FIG. 8, the housing 7 is omitted.

As described above, by the action of the rotor blades 6, a gas flow occurs. In the gas flow, the gas taken in from the lower end opening 76 passes through the cavity 64 and is blown out from the upper end opening 75. Therefore, because a gas flow toward the upper side a occurs below the lower end opening 76 and above the upper end opening 75, the gas introduced into this gas flow enters and exits into and out from the rotor 3, even in the ventilation channel of the inner impeller 81 and spacer 82, and a gas flow in the upper side a direction occurs.

Furthermore, the inner impeller 81 rotates by the rotation of the rotor 3 in an arrow h direction (clockwise direction e) in FIG. 8, and the gas flow in the upper side a direction in the cavity 64 is strengthened by the blades 81c. As a result, a strong gas flow occurs in an arrow g direction in FIG. 8, and the stator 2 including the heat generation source, such as the coil 22 and the stator core 21, in the tubular member 32 of the rotor 3 is efficiently cooled by this gas flow.

In particular, because the coupling member of the upper end opening 75 corresponding to the discharge port side of the gas is the inner impeller 81 including the blades 81c, a large volume of the gas can be taken into the interior of the rotor 3 and discharged. Accordingly, according to the rotating device 1 of the present embodiment, the heat generation source, such as the coil 22 and the stator core 21, can be very efficiently cooled.

As indicated by the arrow g in FIG. 8, in the path of the gas flow from the spacer 82 to the inner impeller 81, only the coil 22, the stator core 21, and the magnet 31 are present. Thus, without the presence of obstacles to the flow of the gas other than these cooling targets, the gas is efficiently supplied to these cooling targets. Furthermore, other than coming into contact with these cooling targets, the gas flows in the axial line direction x. Accordingly, according to the rotating device 1 according to the present embodiment, the gas used for cooling can be efficiently supplied to the cooling targets.

In the present embodiment, the coupling members (inner impeller 81 and spacer 82) including a ventilation channel communicating with the inside and the outside of the rotor 3 are disposed between the bearing 4 and the rotor 3, and thus a ventilation port for the intake and discharge of the gas need not be provided at the tubular member 32. That is, because the coupling members including the ventilation channel can be disposed without increasing a length in the axial line x direction, a reduction in the size of the rotating device 1 can be realized.

In particular, when a ventilation port is provided at the peripheral surface (side surface) of the tubular member 32 (furthermore, the inner tube 61 of the rotor blade 6), it is desirable to dispose the inner impeller near the ventilation port. Accordingly, in this case, the length in the axial line x direction needs to be long, and thus a length of the entire rotating device in the axial direction increases. However, in the present embodiment, an increase in the length of the entire rotating device in the axial direction can be suppressed.

When a ventilation port is provided at the peripheral surface of the tubular member 32 (furthermore, the inner tube 61 of the rotor blade 6), the gas is taken in from a gas flow generated by the rotor blades 6 in the cavity 64 and the gas is returned to this gas flow, leading to disruption of the gas flow in the cavity 64. However, in the present embodiment, the intake port (the spacer 82) and the discharge port (inner impeller 81) of the gas used for cooling are independent from the gas flow generated by the rotor blades 6 in the cavity 64, and thus disruption of the gas flow caused by the rotor blades 6 can be suppressed, and the supply of a strong wind and a large wind volume (large suction volume) as a blowing device (or suction device) can be achieved.

In the present embodiment, of the two coupling members, the coupling member at the upper side a corresponding to the discharge port side of the gas is the inner impeller 81 including the blades 81c. However, the coupling member at the lower side b corresponding to the intake port side of the gas may be the inner impeller including the blades 81c, and the coupling member at the upper side a corresponding to the discharge port side may be replaced with a spacer and the coupling member at the lower side b corresponding to the intake port side may be replaced with the inner impeller. At least one of the discharge port side and the intake port side is an inner impeller, allowing a large volume of the gas to be taken into the rotor 3 and the cooling efficiency to be further improved. In particular, as in the present embodiment, the inner impeller 81 including the blades 81c is provided as a coupling member, making it possible to cause the gas to flow through the coupling member to the stator 2 in the interior of the rotor 3 and cool the stator, and increase the wind volume emitted from the rotating device 1.

The rotor blade 6 includes the inner tube 61 attached at the outer peripheral surface of the tubular member 32, the outer tube 63, and the plurality of blades 62 disposed between the inner tube 61 and the outer tube 63 and coupling the area between the inner tube 61 and the outer tube 63. The rotor blade includes the outer tube 63 surrounding the plurality of blades 62, making it possible to efficiently blow the gas from the rotating device 1. Thus, the gas can be blown even if the housing 7 accommodating the rotor blades 6 is not included.

Second Embodiment

Figure 9:
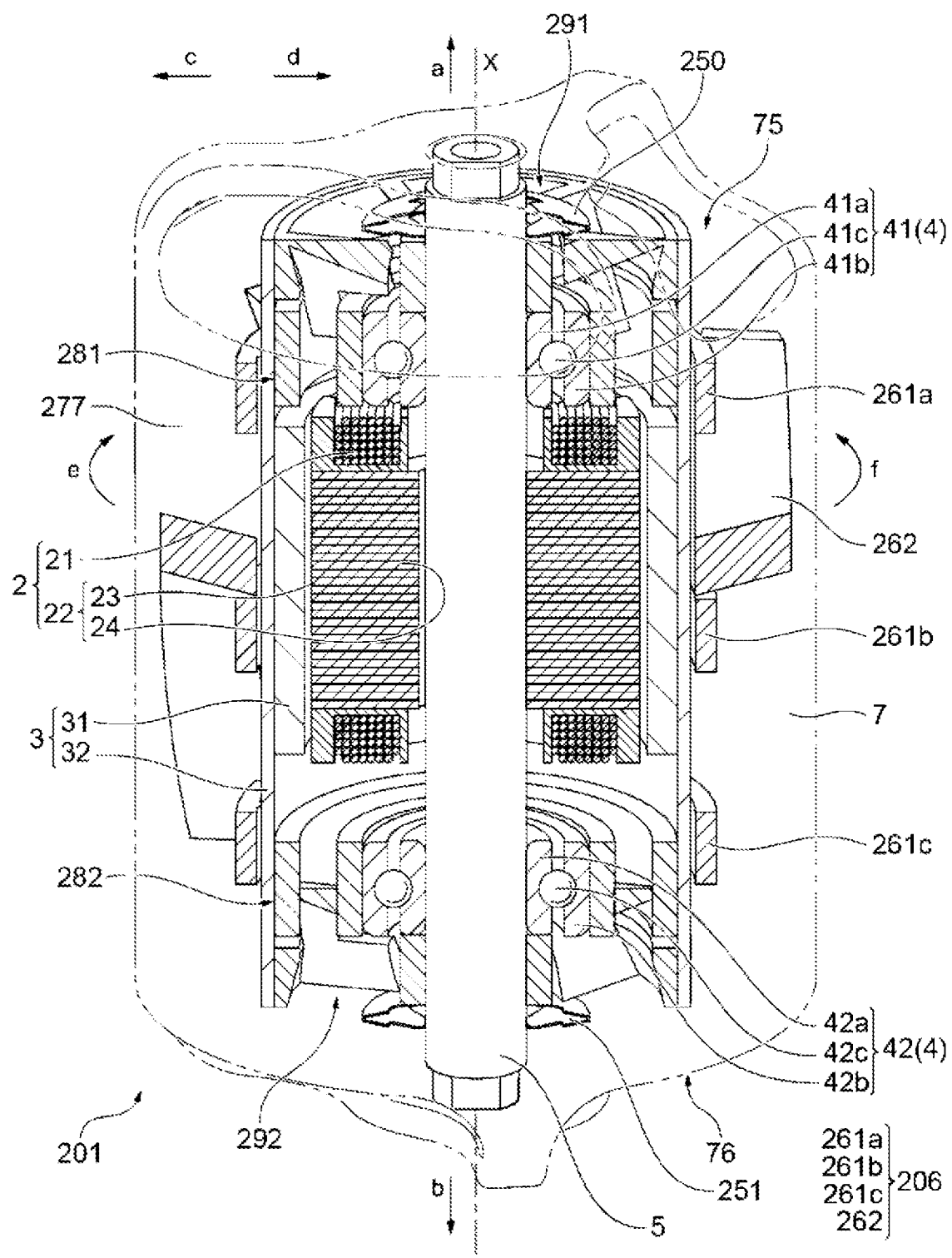
FIG. 9 is a transparent cross-sectional view of a cross section including an axial line x of a rotating device according to a second embodiment as one example of the present invention.

A rotating device according to a second embodiment as one example of the present invention will now be described. FIG. 9 is a transparent cross-sectional view of a cross section including the axial line x of a rotating device 201 according to the second embodiment. The rotating device 201 according to the second embodiment differs from the rotating device 1 according to the first embodiment in a configuration around the upper and lower bearings, and a structure of the rotor blade.

In the second embodiment, members or components having the same function and structure as the function and structure of the first embodiment are denoted in the drawings of the present embodiment by the same reference signs as the reference signs of the first embodiment, and detailed descriptions of those members and components will be omitted (unless a particular description is added).

A coupling member (hereinafter referred to as "spacer") 281 is disposed between the outer ring 41a of the first bearing 41 and the inner peripheral surface of the end part of the tubular member 32 at the upper side a, and a coupling member (hereinafter referred to as "spacer") 282 is also disposed between the outer ring 42a of the second bearing 42 and the inner peripheral surface of the end part of the tubular member 32 at the lower side b. These spacers 281, 282 have the same shape as the shape of the spacer 82 in the first embodiment.

The rotating device 201 according to the present embodiment includes a blade member 291 adjacent to an outer side (upper side a) of the spacer 281 in the axial line x direction and including a plurality of blades (reference sign 291b described below). Further, the rotating device 201 according to the present embodiment includes a blade member 292 adjacent to an outer side (lower side b) of the spacer 282 in the axial line x direction and including a plurality of blades (reference sign 292b described below).

Figure 10:
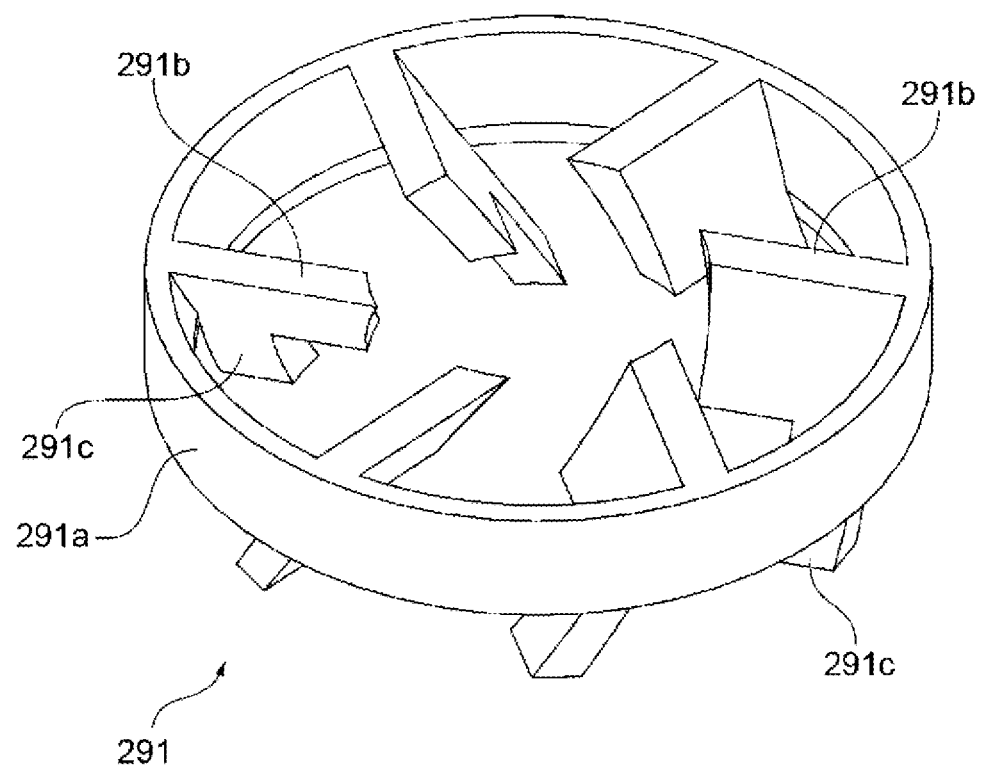
FIG. 10 is an enlarged perspective view of only a blade member at an upper side a in FIG. 9 extracted from the rotating device according to the second embodiment as one example of the present invention.

FIG. 10 illustrates an enlarged perspective view of only the blade member 291 at the upper side a in FIG. 9 extracted from the rotating device 201. As illustrated in FIG. 10, the blade member 291 includes a ring part 291a, a plurality of (in the present embodiment, six) blades 291b extending in the center axis direction from the ring part 291a, and a projecting part 291c projecting downward from a coupling part side with the ring part 291a of each blade 291b.

Figure 11:
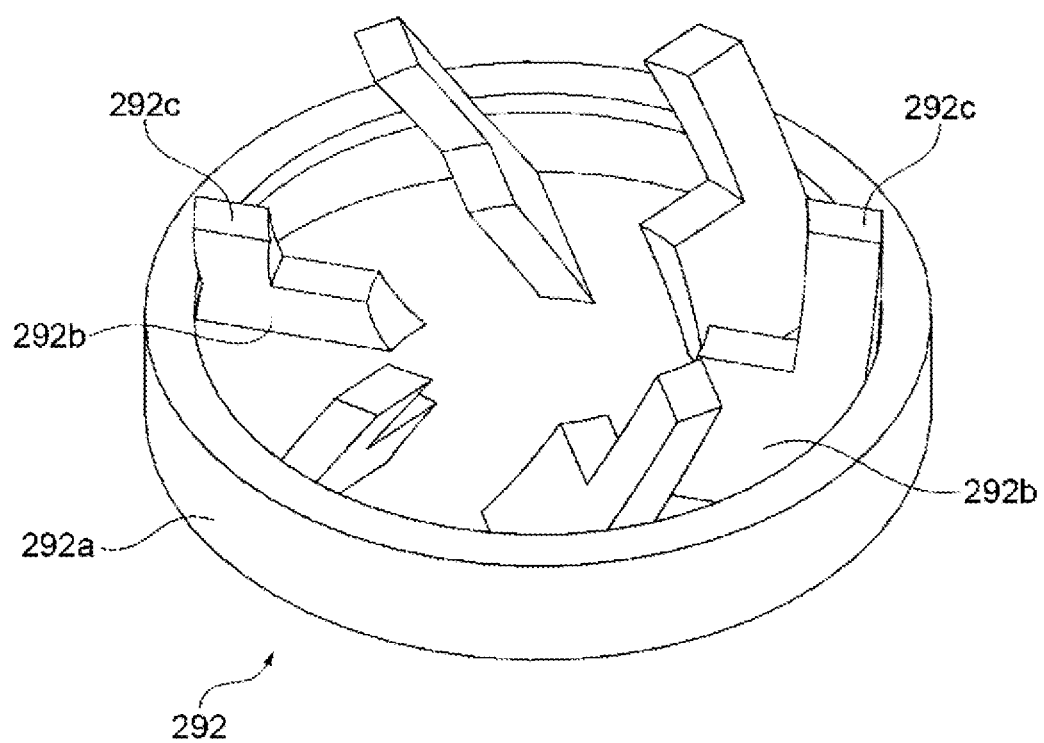
FIG. 11 is an enlarged perspective view of only a blade member at a lower side b in FIG. 9 extracted from the rotating device according to the second embodiment as one example of the present invention.

FIG. 11 illustrates an enlarged perspective view of only the blade member 292 at the lower side b in FIG. 9 extracted from the rotating device 201. As illustrated in FIG. 11, the blade member 292 includes a ring part 292a, a plurality of (in the present embodiment, six) blades 292b extending in the center axis direction from the ring part 292a, and a projecting part 292c projecting downward from a coupling part side with the ring part 292a of each blade 292b.

The blade member 291 and the blade member 292 are disposed vertically inverted but are members having substantially the same shape and the same configuration.

The blade members 291, 292 may be molded with any material such as a resin or aluminum or other metal, but are preferably molded with a resin from the perspectives of weight reduction, low cost, and moldability.

As illustrated in FIGS. 10 and 11, the plurality of blades 291b, 292b is oriented in a direction inclined with respect to the axial line x direction (axial direction of the shaft member 5). The six blades 291b, 292b are inclined at the same angle. Therefore, the blade members 291, 292 are configured to function as a so-called fan for generating a flow of a gas in the axial line x direction by rotating.

Figure 12:
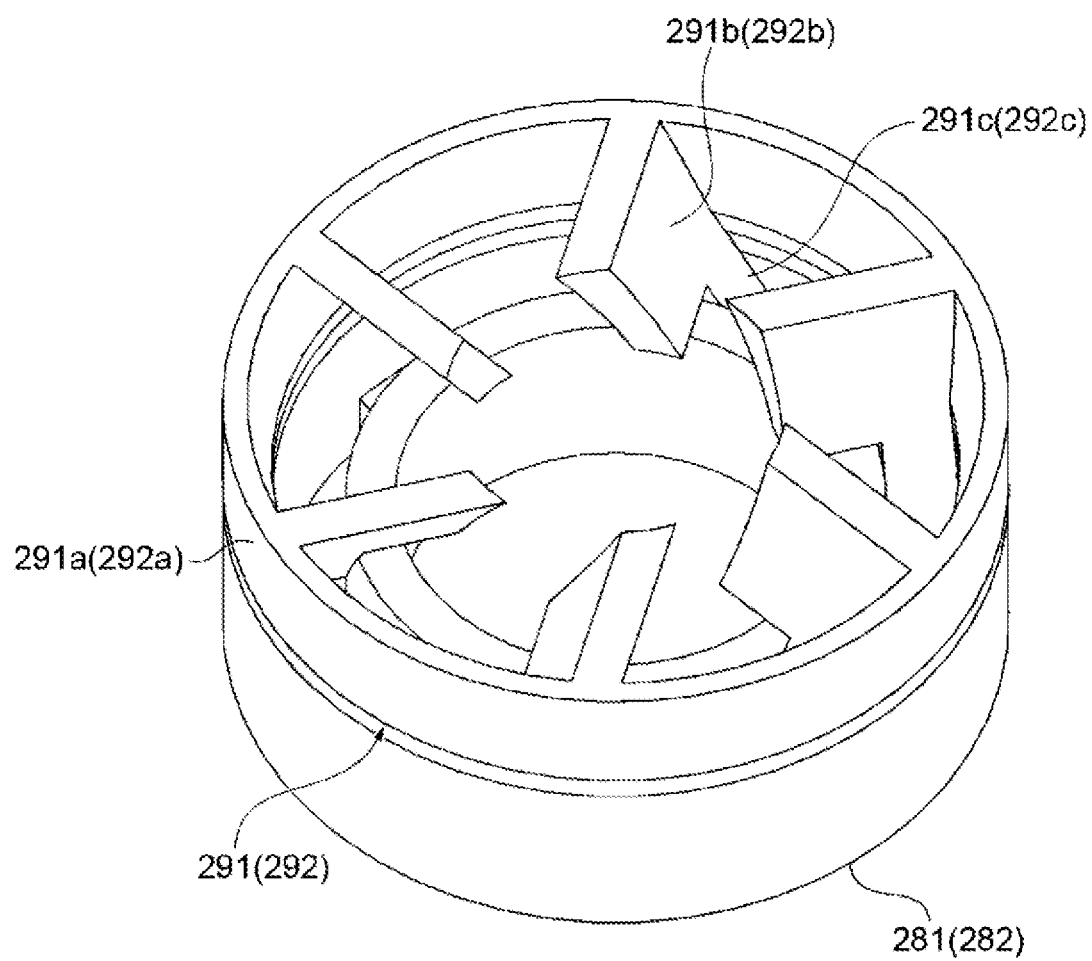
FIG. 12 is an enlarged perspective view of only the blade member and the spacer at the upper side a (lower side b) in FIG. 9 extracted from the rotating device according to the second embodiment as one example of the present invention.

FIG. 12 illustrates an enlarged perspective view of only the spacer 281 and the blade member 291 at the upper side a in FIG. 9 extracted from the rotating device 201. The spacer 282 and the blade member 292 at the lower side b in FIG. 9 are also disposed vertically inverted but have the same shapes or structures, and thus the reference signs of the spacer 282 and the blade member 292 are also denoted in parentheses in FIG. 12.

Figure 13:
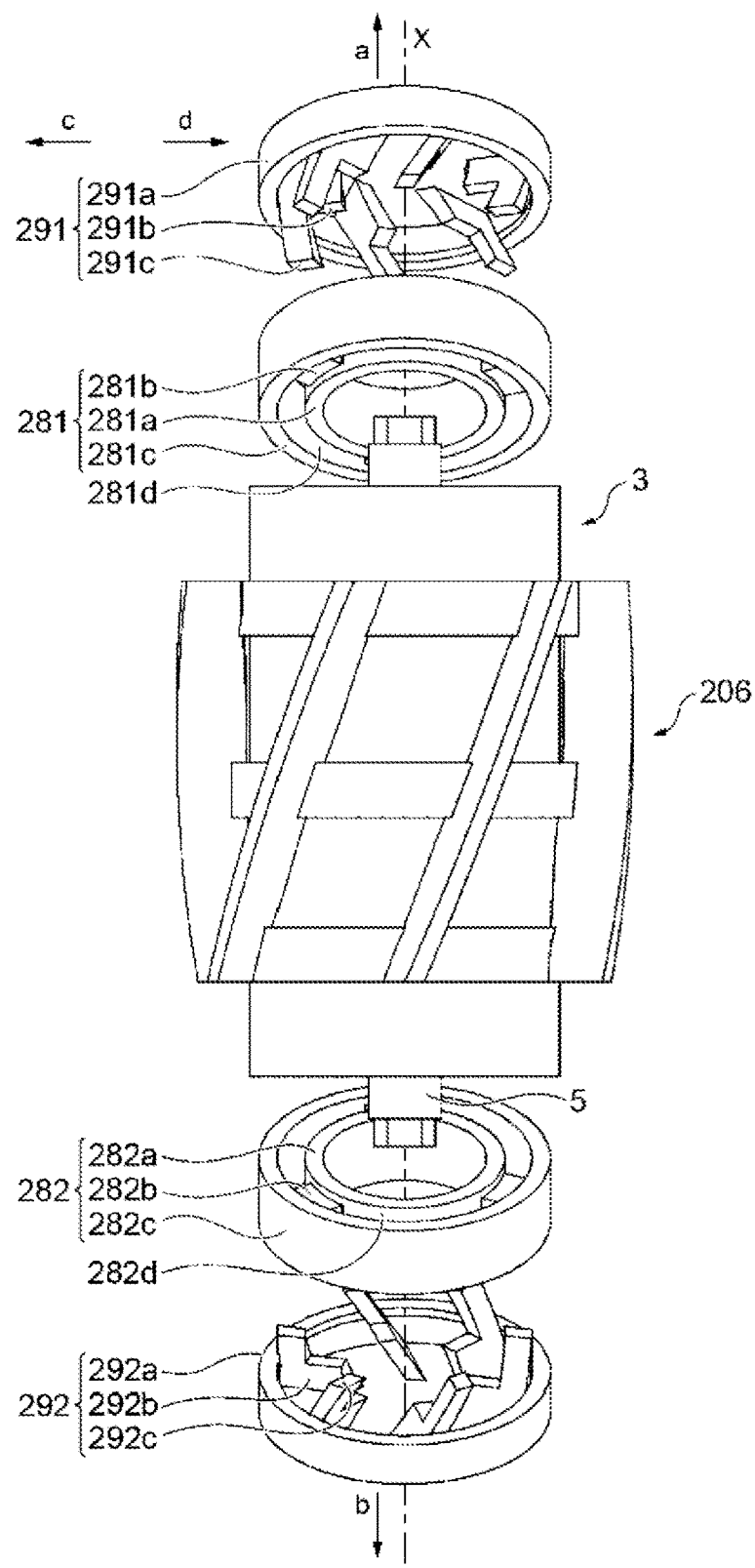
FIG. 13 is an exploded perspective view of the rotating device according to the second embodiment as one example of the present invention.

FIG. 13 illustrates an exploded perspective view of the rotating device 201 according to the present embodiment. In FIG. 13, the housing 7 is not illustrated.

As illustrated in FIGS. 12 and 13, the blade members 291, 292 are stacked on the spacers 281, 282 so that the projecting parts 291c, 292c face the spacers 281, 282.

The spacers 281, 282 includes ring parts (hereinafter referred to as "inner ring parts") 281a, 282a at an inner side, ring parts (hereinafter referred to as "outer ring parts") 281b, 282b at an outer side, and a plurality of (three in the present embodiment) spokes 281c, 282c connecting areas between the inner ring parts 281a, 282a and the outer ring parts 281b, 282b.

The spacers 281, 282 have a simple hole opening shape to ensure accuracy and strength as coupling members with ease and at low cost.

An inner peripheral surface of the inner ring part 281a of the spacer 281 is fixed to the outer peripheral surface of the outer ring 41a of the first bearing 41. An inner peripheral surface of the inner ring part 282a of the spacer 282 is fixed to the outer peripheral surface of the outer ring 42a of the second bearing 42. The fixing of the inner peripheral surfaces of the inner ring parts 281a, 282a and the outer peripheral surfaces of the outer rings 41a, 42a is not particularly limited, and may be performed by any known method, such as, for example, press-fitting, interference-fitting, fixing with an adhesive, or engagement, or a combination of a plurality of these fixing means (fixing elements).

Outer peripheral surfaces of the outer ring parts 281b, 282b of the spacers 281, 282 are fixed to the inner peripheral surfaces of the end parts of the tubular member 32 at both the upper and lower sides ab in the axial line x direction. The fixing of the outer peripheral surfaces of the outer ring parts 281b, 282b and the inner peripheral surface of the tubular member 32 is also not particularly limited, and may be performed by any known method, such as, for example, press-fitting, interference-fitting, fixing with an adhesive, or engagement, or a combination of a plurality of these fixing means (fixing elements).

The spacers 281, 282 form penetrating parts 281d, 282d penetrating as a ventilation channel enabling the passage of a gas at positions excluding positions of the spokes 281c, 282c between the inner ring parts 281a, 282a and the outer ring parts 281b, 282b. The spokes 281c, 282c are connected to the inner ring parts 281a, 282a and the outer ring parts 281b, 282b at substantially centers of the spacers 281, 282 in a thickness direction (axial line x direction). Therefore, in the spacers 281, 282, the spokes 281c, 282c are positioned inward of end surfaces of the inner ring parts 281a, 282a and the outer ring parts 281b, 282b at the stator 2 side. These spokes 281c, 282c, inner ring parts 281a, 282a, and outer ring parts 281b, 282b form stepped parts recessed in the axial line x direction.

The projecting parts 291c, 292c of the blade members 291, 292 are fitted into and thus integrated with the penetrating parts and the stepped parts in the spacers 281, 282, as illustrated in FIG. 12. A plate spring 250 is attached near the end part of the shaft member 5 at the upper side a, biasing the blade member 291 and the bearing 41 from the upper side a. With this biasing force of the plate spring 250, the blade member 291 and the spacer 281 are stably integrated.

A plate spring 251 is attached near the end part of the shaft member 5 at the lower side b, biasing the blade member 292 and the bearing 42 from the lower side b. With this biasing force of the plate spring 251, the blade member 292 and the spacer 282 are stably integrated.

As described above, the spacers 281, 282 are fixed to the inner peripheral surface of the tubular member 32 of the rotor 3.

Accordingly, the blade members 291, 292 fixed to the tubular member 32 of the rotor 3 with the spacers 281, 282 interposed between the blade members 291, 292 and the tubular member 32 are configured to rotate in accordance with the rotation of the rotor 3.

Next, a rotor blade 206 will be described with reference to FIG. 14.

Figure 14:
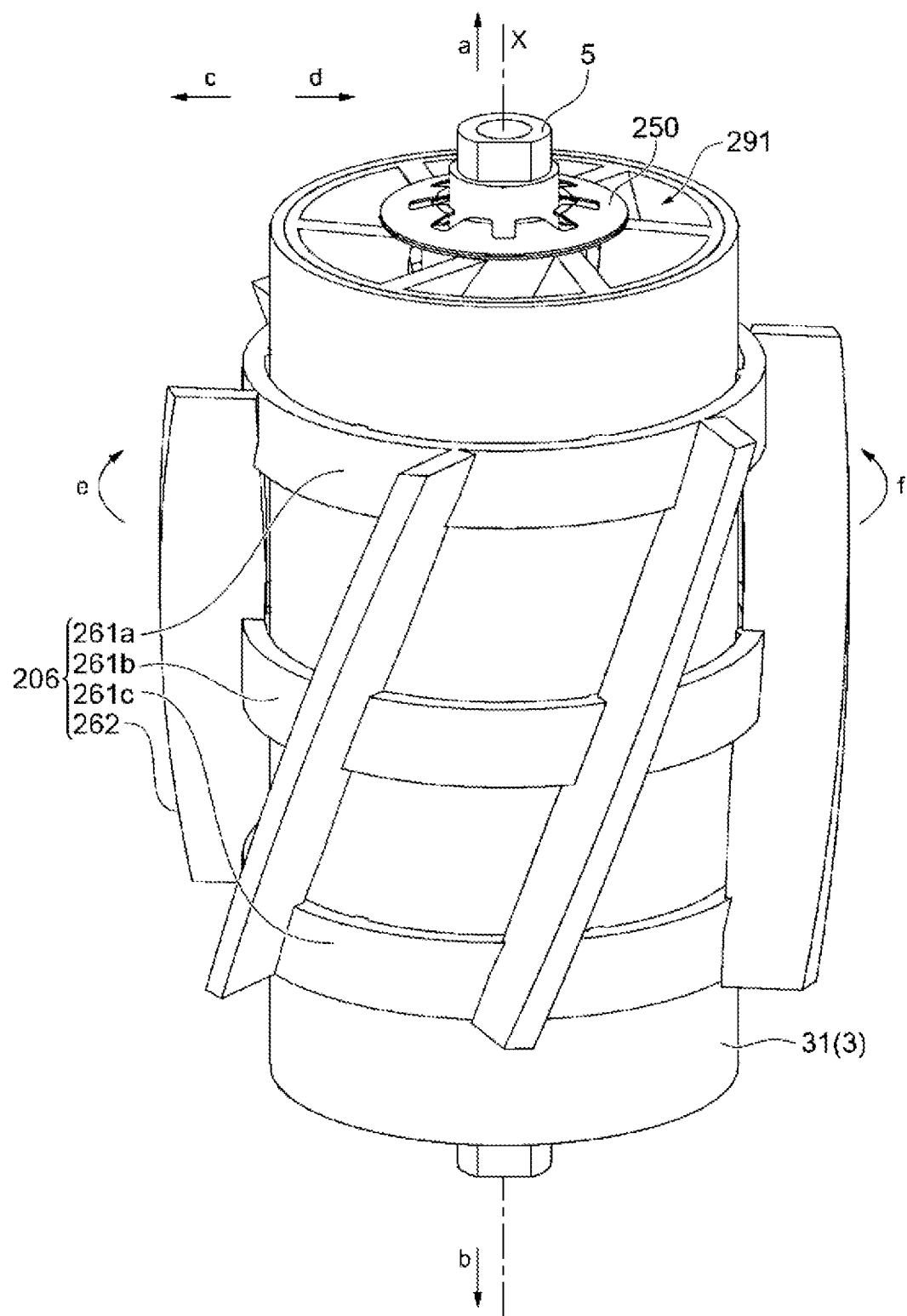
FIG. 14 is a perspective view with only a housing removed from the rotating device according to the second embodiment as one example of the present invention.

FIG. 14 is a perspective view removing only the housing 7 from the rotating device 201 according to the present embodiment. As illustrated in FIG. 14, the rotor blade 206 is attached to the outer peripheral surface of the tubular member 32 of the rotor 3, extending across about 70% of the length of the tubular member 32 in the axial direction (axial line x direction).

The rotor blade 206 includes three fixing parts 261a, 261b, 261c having an annular shape, arranged at equal intervals in the axial line x direction, and attached to the outer peripheral surface of the tubular member 32, and a plurality of (six in the present embodiment) blades 262 fixed obliquely with respect to the axial line x direction so as to bridge these three fixing parts 261a, 261b, 261c.

The blades 262 are oriented in a direction inclined with respect to the axial line x direction of the shaft member 5.

The six blades 262 are equally spaced apart in the circumferential directions of and inclined at the same angle.

The rotor blade 206 is attached to the outer peripheral surface of the tubular member 32 by fitting the tubular member 32 of the rotor 3 into the rings of the three fixing parts 261a, 261b, 261c, and fixing the tubular member 32 in a predetermined position by an adhesive or the like. Accordingly, the rotor blade 206 rotates in the housing 7 as the rotor 3 rotates.

The rotor blade 206 rotates in accordance with the rotation of the rotor 3, and thus rotates together with the rotor 3, generating a flow of a gas in the axial line x direction in accordance with the rotation of the rotor blade 206. This flow of air occurs in either the upward direction or the downward direction of the axial direction of the shaft member 5 in a cavity 277 between the rotor 3 and the housing 7. In the rotating device 201 according to the present embodiment, the rotating device 201 is configured to be driven to rotate the rotor blade 206 in the clockwise circumferential direction e, causing the gas taken in from the lower end opening 76 to pass through the cavity 277 and blow out from the upper end opening 75.

The rotating device 201 according to the present embodiment, as in the first embodiment, can achieve a size reduction of the entire rotating device, supply a strong wind and a large wind volume (large suction volume), stabilize the rotation of the rotor 3, and achieve high rotation and high torque, and thus provide excellent characteristics as a rotating device.

In the present embodiment as well, the coupling members (spacers 281, 282) including the ventilation channel communicating with the inside and the outside of the rotor 3 are disposed between the bearing 4 and the rotor 3, thereby achieving efficient cooling of the stator 2.

Figure 15:
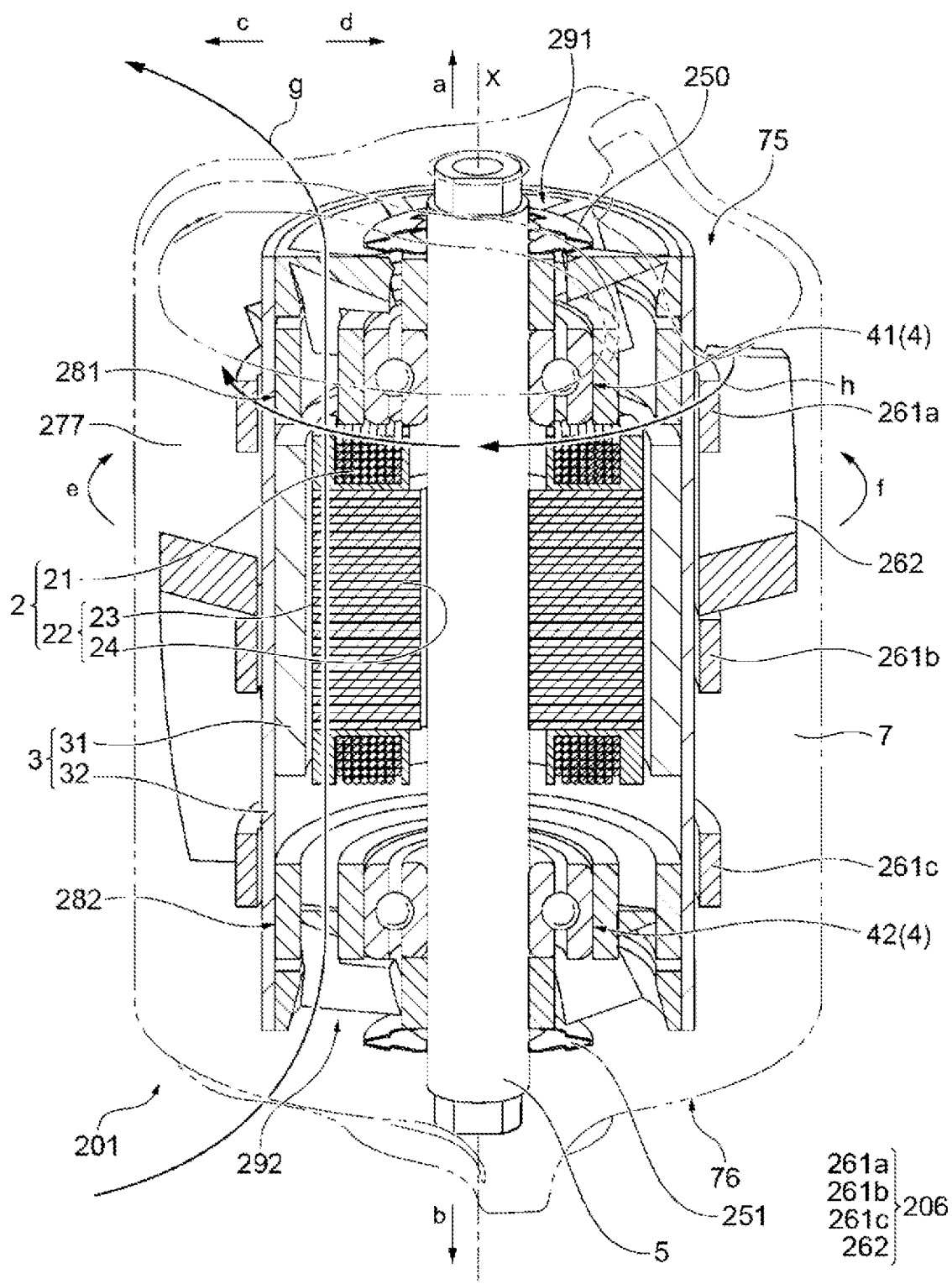
FIG. 15 is an explanatory diagram for describing a flow of a gas for cooling an inside of a rotor of the rotating device according to the second embodiment as one example of the present invention.

FIG. 15 illustrates an explanatory diagram for describing a flow of a gas for cooling the inside of the rotor 3 of the rotating device 201 according to the present embodiment.

As described above, by the action of the rotor blade 206, a gas flow occurs. In the gas flow, air taken in from the lower end opening 76 passes through the cavity 277 and is blown out from the upper end opening 75. Therefore, because a gas flow toward the upper side a occurs below the lower end opening 76 and above the upper end opening 75, the gas introduced into this gas flow enters and exits into and out from the rotor 3, even in the ventilation channel of the spacers 281, 282, and a gas flow in the upper side a direction occurs.

Furthermore, by the rotation of the rotor 3 in the arrow h direction (clockwise direction e) in FIG. 15, the blade members 291, 292 rotate, strengthening the gas flow in the upper side a direction in the tubular member 32 by the blades 291b, 292b. As a result, a strong gas flow occurs in the arrow g direction in FIG. 15, and the stator 2 including the heat generation source, such as the coil 22 and the stator core 21, in the tubular member 32 of the rotor 3 is efficiently cooled by this gas flow.

In particular, the blade members 291, 292 including the blades 291b, 292b are provided at both sides of the upper end opening 75 and the lower end opening 76, and thus a large volume of the gas can be taken into the interior of the rotor 3 and discharged. Accordingly, according to the rotating device 201 of the present embodiment, the heat generation source, such as the coil 22 and the stator core 21, can be very efficiently cooled.

As indicated by the arrow g in FIG. 15, in the path of the gas flow from the spacer 282 to the spacer 281, only the coil 22, the stator core 21, and the magnet 31 are present. Thus, without the presence of any obstacle to the flow of the gas other than these cooling targets, the gas is efficiently supplied to these cooling targets. Furthermore, other than coming into contact with these cooling targets, the gas flows in the axial line direction x. Accordingly, according to the rotating device 201 according to the present embodiment, the gas used for cooling can be efficiently supplied to the cooling targets.

In the present embodiment, the coupling members (spacers 281, 282) including the ventilation channel communicating with the inside and the outside of the rotor 3 are disposed between the bearing 4 and the rotor 3, and thus a ventilation port for the intake and discharge of the gas need not be provided at the tubular member 32. That is, because the coupling members including the ventilation channel can be disposed without increasing a length in the direction of the axial line x direction, a reduction in the size of the rotating device 201 can be realized.

When a ventilation port is provided at the peripheral surface of the tubular member 32, the gas is taken in from a gas flow generated by the rotor blade 206 in the cavity 277 and the gas is returned to this gas flow, leading to disruption of the gas flow in the cavity 277. However, in the present embodiment, the intake port (blade member 292 and spacer 282) and the discharge port (spacer 281 and blade member 291) of the gas used for cooling are independent from the gas flow by the rotor blade 6 in the cavity 277, and thus disruption of the gas flow generated by the rotor blade 6 can be suppressed, and the supply of a strong wind and a large wind volume (large suction volume) as a blowing device (or suction device) can be achieved.

In the present embodiment, an example including the blade members 291, 292 adjacent to both of the two coupling members (spacers 281, 282) and including the blades 291b, 292b is given; however, by providing a blade member at at least one of the discharge port side and the intake port side, it is possible to take a large volume of the gas into the rotor 3 and further improve the cooling efficiency. A blade member including blades may be provided at the discharge port side to improve the wind volume blown out from the rotating device and improve a wind pressure.

With the rotor blade 206 including the fixing parts 261a, 261b, 261c having annular shapes, a region (area) coming into contact with the rotor (rotating body) 3 can be reduced and, as a result, a region (area) exposed to the gas at the outer peripheral side of the rotor 3 can be increased, making it possible to improve a heat dissipation of the rotor 3.

In the present embodiment, unlike the first embodiment with the coupling member itself as the inner impeller 81, the coupling members (spacers 281, 282) and the blade members 291, 292 generating the gas flow in the tubular member 32 are separated.

Therefore, in the present embodiment, there is a high degree of freedom in the shape of the coupling member, making it possible to enlarge a cross-sectional area of the ventilation channel in the coupling member and improve the strength of the coupling member in comparison to the first embodiment.

The high degree of freedom in the shape of the coupling member significantly reduces size limitation of the bearing 4 side.

The rotating device can be assembled without the blade members and can be shaped in that state, and thus a plurality of types of blade members of different shapes, sizes, and thicknesses, for example, can be prepared for different applications and purposes, and selection can be made from among the different types on a case-by-case basis. That is, by mass producing, or the like, the rotating device in a state without the blade members and then assembling the blade members in accordance with the application or purpose as appropriate, it is possible to accommodate a wide range of needs and achieve a significant advantage in terms of cost.

Third Embodiment

Figure 16:
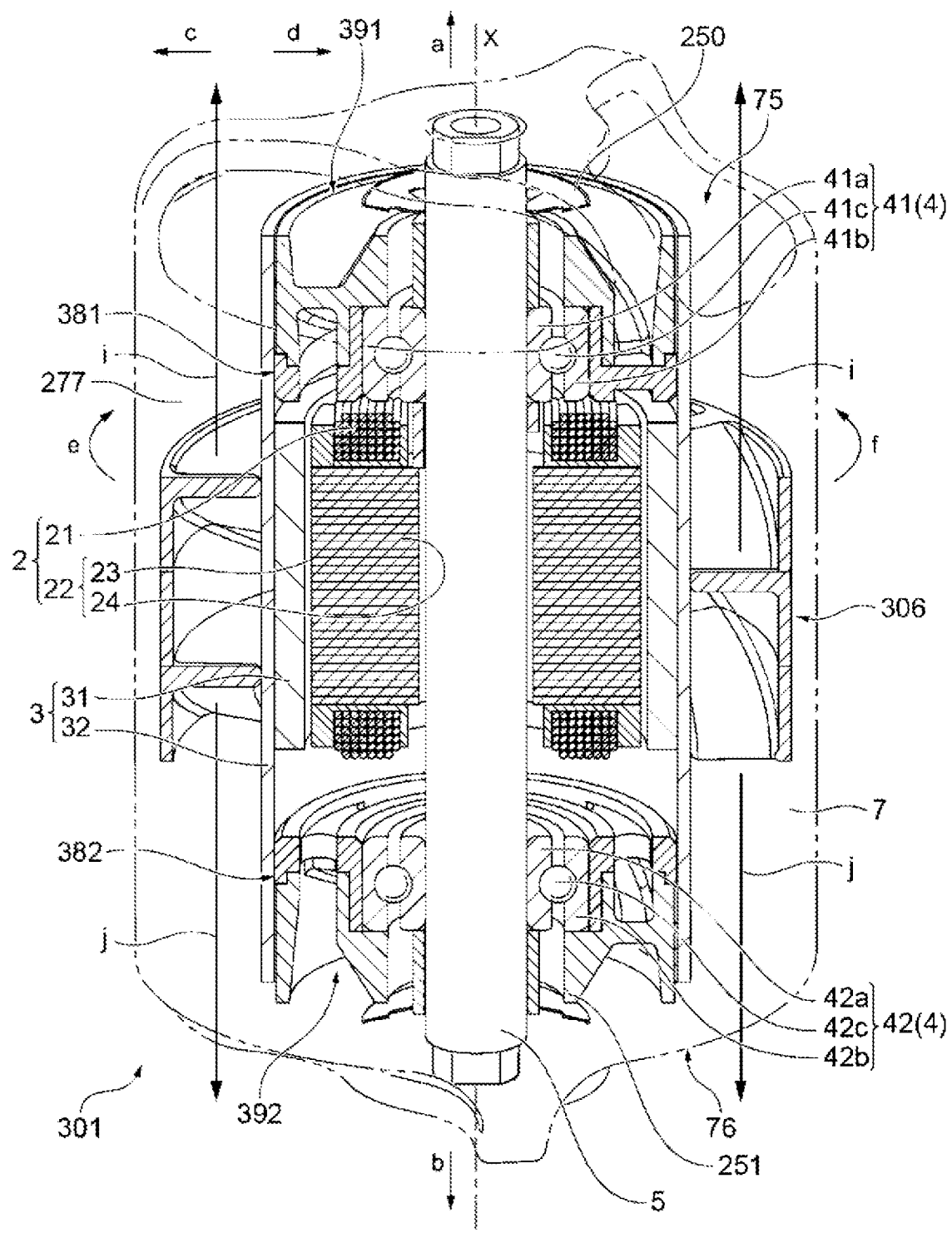
FIG. 16 is a transparent cross-sectional view of a cross section including an axial line x of a rotating device according to a third embodiment as one example of the present invention.

A rotating device according to a third embodiment as one example of the present invention will now be described. FIG. 16 is a transparent cross-sectional view of a cross section including the axial line x of a rotating device 301 according to the third embodiment. The rotating device 301 according to the third embodiment differs from the rotating device 1 according to the first embodiment and the rotating device 201 according to the second embodiment in a configuration around the upper and lower bearings, and a structure of the rotor blade.

In the third embodiment, members or components having the same function and structure as the functions and structures of the first embodiment or the second embodiment are denoted in the drawings of the present embodiment by the same reference signs as the reference signs of the first embodiment or the second embodiment, and detailed descriptions of those members and components will be omitted (unless a particular description is added).

A coupling member (hereinafter referred to as "spacer") 381 is disposed between the outer ring 41a of the first bearing 41 and the inner peripheral surface of the end part of the tubular member 32 at the upper side a, and a coupling member (hereinafter referred to as "spacer") 382 is also disposed between the outer ring 42a of the second bearing 42 and the inner peripheral surface of the end part of the tubular member 32 at the lower side b.

The rotating device 301 according to the present embodiment includes a blade member 391 adjacent to an outer side (upper side a) of the spacer 381 in the axial line x direction and including a plurality of blades (reference sign 391c described below). The rotating device 301 according to the present embodiment includes a blade member 392 adjacent to an outer side (lower side b) of the spacer 382 in the axial line x direction and including a plurality of blades (reference sign 392c described below).

Figure 17:
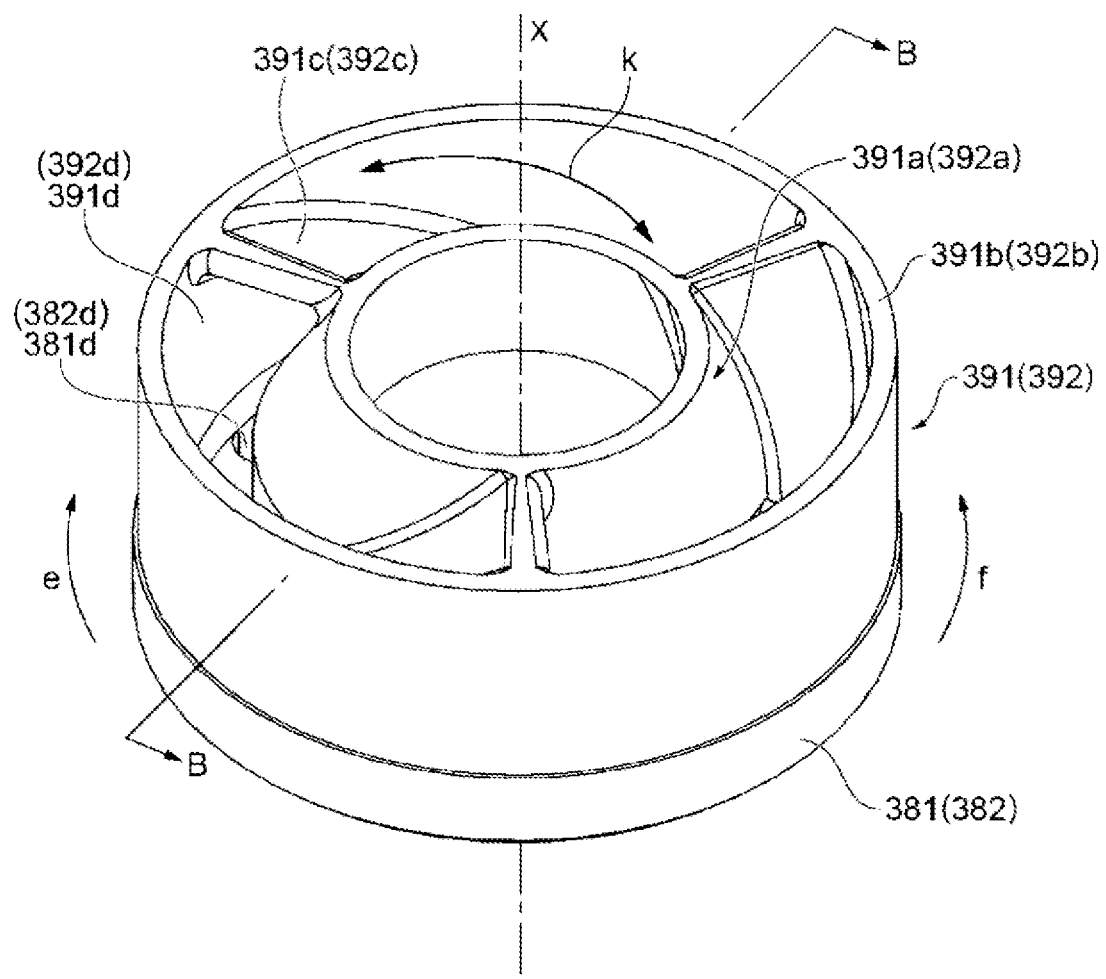
FIG. 17 is an enlarged perspective view of only a spacer and a blade member at an upper side a (lower side b) in FIG. 16 extracted from the rotating device according to the third embodiment as one example of the present invention.
Figure 18:
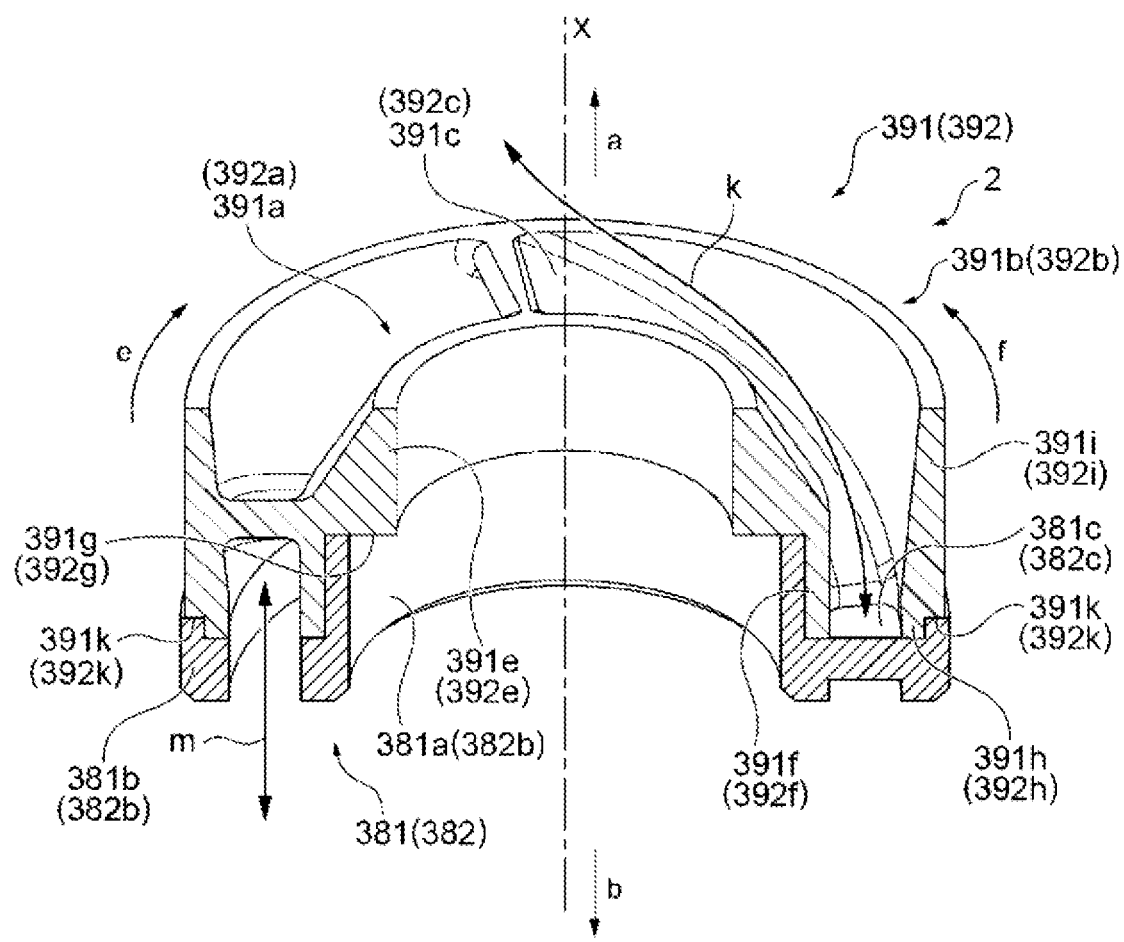
FIG. 18 is a cross-sectional perspective view taken along a cross section B-B including the axial line x in FIG. 17.

FIG. 17 illustrates an enlarged perspective view of only the spacer 381 and the blade member 391 at the upper side a in FIG. 16 extracted from the rotating device 301. FIG. 18 illustrates a cross-sectional perspective view taken along a cross section B-B including the axial line x in FIG. 17. Furthermore, FIG. 19 illustrates an exploded perspective view of the spacer 381 and the blade member 391.

The spacer 382 and the blade member 392 at the lower side b in FIG. 16 are also disposed vertically inverted but have substantially the same shapes and the same configurations. Accordingly, the reference signs of the spacer 382 and the blade member 392 are also denoted in parentheses in FIGS. 17 to 19. In the following, the spacer 381 and the blade member 391 at the upper side a will be mainly described, and the same applies to the spacer 382 and the blade member 392 at the lower side a.

Figure 19:
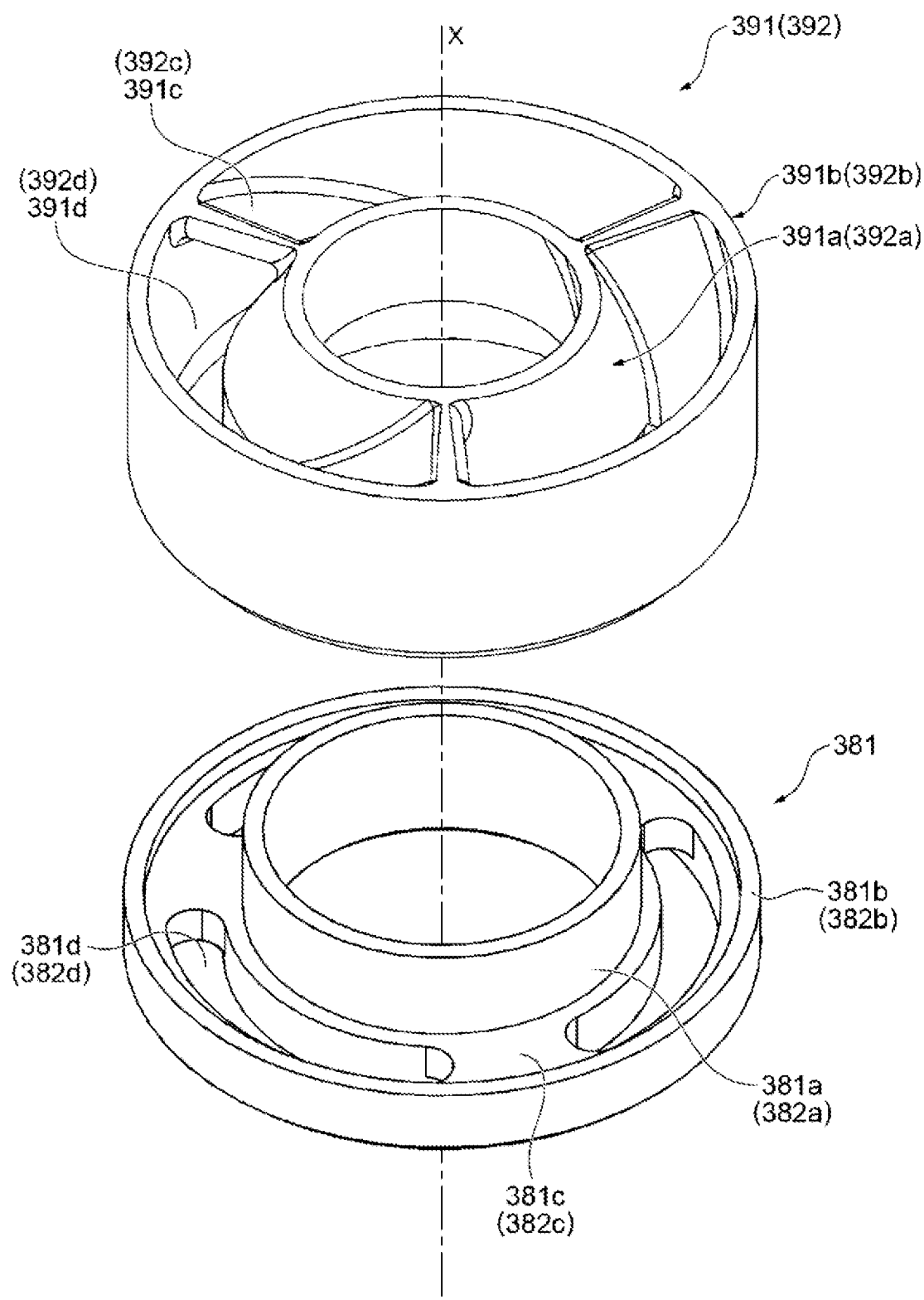
FIG. 19 is an exploded perspective view of only the spacer and the blade member extracted from the rotating device according to the third embodiment as one example of the present invention.

As illustrated in FIGS. 17 to 19, the blade member 391 includes a ring part (hereinafter referred to as "inner ring part") 391a at an inner side, a ring part (hereinafter referred to as "outer ring part") 391b at an outer side, and the plurality of (three in the present embodiment) blades 391c connecting an area between the inner ring part 391a and the outer ring part 391b. With the ring parts (inner ring part 391a and outer ring part 391b) provided at both the inner peripheral side and the outer peripheral side, the blades 391c are reinforced and the strength of the blade member 391 is improved.

The blade members 391, 392 may be molded with any material such as a resin or aluminum or other metal, but are preferably molded with a resin from the perspectives of weight reduction, low cost, and moldability.

As illustrated in FIGS. 17 to 19, the three blades 391c are oriented in a direction inclined with respect to the axial line x direction (axial direction of the shaft member 5). These three blades 391c are inclined at the same angle and are helical in shape. A cavity 391d is formed between the three blades 391c.

The blade member 391 rotates in one of the circumferential directions ef, moving a gas in one of the directions of a double-headed arrow k in FIGS. 17 and 18 in the cavity 391d, generating a flow of the gas in the axial line x direction. That is, the blade member 391 functions as a so-called fan.

As illustrated in FIG. 18, the inner ring part 391a includes a conical tubular part 391e including an inclined surface having a cross-sectional shape extending from the upper side a to the lower side b, and being thick at a lower side. The inner ring part 391a includes a projecting part (hereinafter referred to as "cylindrical projecting part") 391f having a cylindrical shape and extending from an outermost periphery of the conical tubular part 391e to the lower side b at a bottom part 391g of the conical cylindrical part 391e.

As illustrated in FIG. 18, the outer ring part 391b includes a conical tubular part 391i including an inclined surface having a cross-sectional shape extending slightly from the upper side a to the lower side b, and being slightly thick at a lower side, and a projecting part (hereinafter referred to as a "cylindrical projecting part") 391h having a cylindrical shape extending from an inner peripheral side to the lower side b and notched and recessed at a corner of an outer periphery of an end part at the lower side b (the notched location is referred to as "notch 391k" as a recessed part).

A length of the cylindrical projecting part 391f is longer than a length of the cylindrical projecting part 391h in the axial line x direction, and end parts (lower ends) of the cylindrical projecting part 391f and the cylindrical projecting part 391h at the lower side b are at the same positions.

The spacer 381 includes a base 381c having an annular shape and opposing the three blades 391c of the blade member 391, a ring part (hereinafter referred to as "inner ring part") 381a having a tubular shape, connected at an inner peripheral side of the base 381c, and extending in upward and downward directions ab of the axial line x, and a ring part (hereinafter referred to as "outer ring part") 381b having a tubular shape, connected at an outer peripheral side of the base 381c, and extending in the upward and downward directions ab of the axial line x. In the axial line x direction, the inner ring part 381a is longer than the outer ring part 381b.

The spacers 381, 382 have a simple hole opening shape to ensure accuracy and strength as the coupling member with ease and at low cost.

An inner peripheral surface of the inner ring part 381a of the spacer 381 is fixed to the outer peripheral surface of the outer ring 41a of the first bearing 41. An inner peripheral surface of the inner ring part 382a of the spacer 382 is fixed to the outer peripheral surface of the outer ring 42a of the second bearing 42. The fixing of the inner peripheral surfaces of the inner ring parts 381a, 382a and the outer peripheral surfaces of the outer rings 41a, 42a is not particularly limited, and may be performed by any known method, such as, for example, press-fitting, interference-fitting, fixing with an adhesive, or engagement, or a combination of a plurality of these fixing means (fixing elements).

Outer peripheral surfaces of the outer ring parts 381b, 382b of the spacers 381, 382 are fixed to the inner peripheral surfaces of the end parts of the tubular member 32 at both the upper and lower sides ab in the axial line x direction. The fixing of the outer peripheral surfaces of the outer ring parts 381b, 382b and the inner peripheral surface of the tubular member 32 is also not particularly limited, and may be performed by any known method, such as, for example, press-fitting, interference-fitting, fixing with an adhesive, or engagement, or a combination of a plurality of these fixing means (fixing elements).

In the spacer 381, three hole parts 381d having an elliptical shape forming an arc are formed in the base 381c. The hole parts 381d form a ventilation channel enabling the passage of a gas. The base 381c is connected to the inner ring part 381a and the outer ring part 382b at the slightly lower side b of the spacers 381, 382 in the thickness direction (axial line x direction). Therefore, in the spacers 381, the base 381c is positioned inward of the end surfaces of the inner ring part 381a and the outer ring part 381b at the stator 2 side. The base 381c, the inner ring part 381a, and the outer ring part 381b form a stepped part recessed in the axial line x direction.

The cylindrical projecting part 391f and the cylindrical projecting part 391h of the blade member 391 are fitted into and thus integrated with the stepped part of the spacer 381, as illustrated in FIG. 18. That is, lower ends of the cylindrical projecting part 391f and the cylindrical projecting part 391h come into contact with a surface of the base 381c at the upper side a, an upper end of the inner ring part 381a comes into contact with the bottom 391g of the conical tubular part 391e, an upper end of the outer ring part 381b comes into contact with the notch 391k of the conical tubular part 391e, and the blade member 391 and the spacer 381 are engaged and integrated.

The cavity 391d in the blade member 391 integrated with the spacer 381 is connected to the hole parts 381d corresponding to the ventilation channel of the spacer 381 to form the ventilation channel of the blade member 391. That is, in FIGS. 17 and 18, the flow of the gas in the cavity 391d indicated by the double-headed arrow k connects with the flow of the gas at the hole parts 381d indicated by a double-headed arrow m in FIG. 18, forming a ventilation channel communicating with the inside and the outside of the rotor 3 as a whole.

As illustrated in FIG. 16, the plate spring 250 is attached near the end part of the shaft member 5 at the upper side a, biasing the blade member 391 and the bearing 41 from the upper side a. With this biasing force of the plate spring 250, the blade member 391 and the spacer 381 are stably integrated.

The plate spring 251 is attached near the end part of the shaft member 5 at the lower side b, biasing the blade member 392 and the bearing 42 from the lower side b. Due to the biasing force of the plate spring 251, the blade member 392 and the spacer 382 are stably integrated.

As described above, the spacers 381, 382 are fixed to the inner peripheral surface of the tubular member 32 of the rotor 3.

Accordingly, the blade members 391, 392 fixed to the tubular member 32 of the rotor 3 with the spacers 381, 382 interposed between the blade members 391, 392 and the tubular member 32 are configured to rotate in accordance with the rotation of the rotor 3.

Next, a rotor blade 306 will be described with reference to FIGS. 20 and 21.

Figure 20:
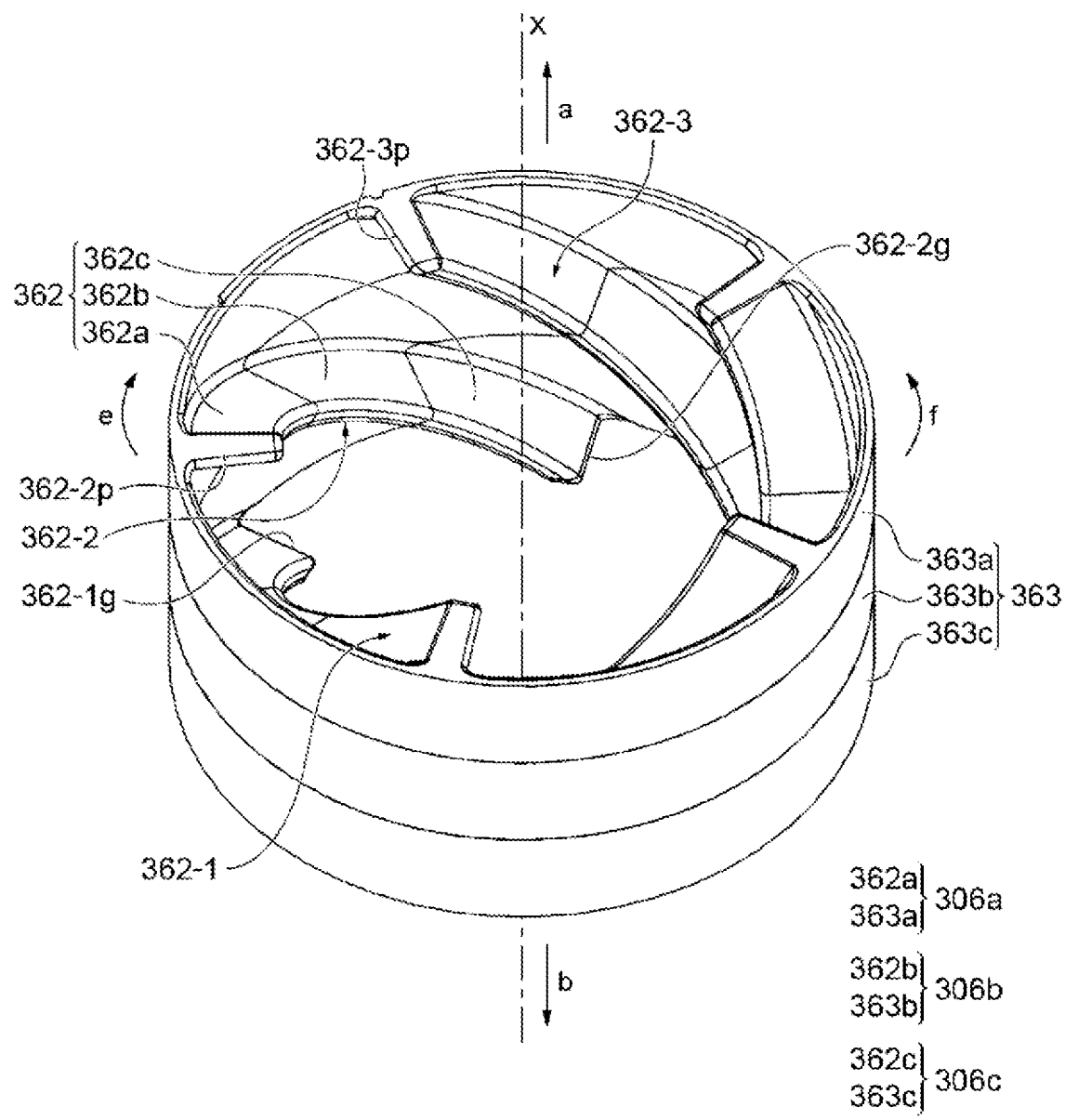
FIG. 20 is a perspective view of only rotor blades extracted from the rotating device according to the third embodiment as one example of the present invention.

FIG. 20 is a perspective view of only the rotor blade 306 extracted from the rotating device 301 according to the present embodiment. FIG. 21 is an exploded perspective view of the rotor blade 306. As illustrated in FIG. 16, the rotor blade 306 is attached to a central region of the tubular member 32 of the rotor 3 in the axial direction (axial line x direction), at the outer peripheral surface of the tubular member 32.

The rotor blade 306 includes a tube 363 having a cylindrical shape and a plurality of (five in the present embodiment) blades 362 obliquely fixed to an inner peripheral surface of the tube 363.

The blades 362 are oriented in a direction inclined with respect to the axial line x direction of the shaft member 5. The five blades 362 are equally spaced apart in the circumferential directions ef, inclined at the same angle, and helical in shape.

Figure 21:
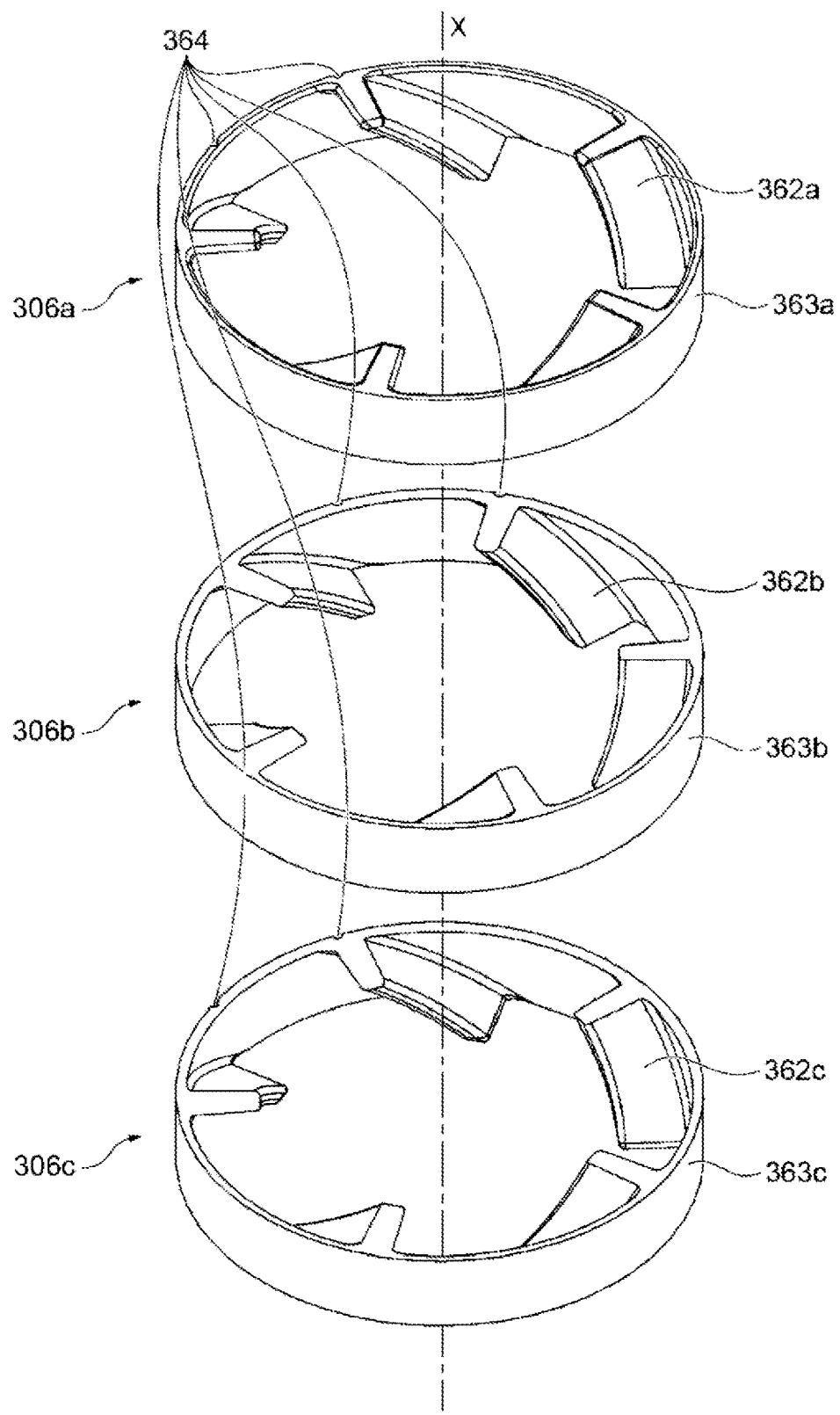
FIG. 21 is an exploded perspective view of only the rotor blades extracted from the rotating device according to the third embodiment as one example of the present invention.

As illustrated in FIGS. 20 and 21, the rotor blade 306 is formed with three rotor blade members 306a, 306b, 306c lined in the axial line x direction. The rotor blade members 306a, 306b, 306c respectively include tubular parts 363a, 363b, 363c, and five blade parts 362a, 362b, 362c projecting inward from an inner surface. These five blade parts 362a, 362b, 362c are formed as ribs extending toward the axial x line at the inner surface.

The three rotor blade members 306a, 306b, 306c are stacked in the axial line x direction, aligning the tubular parts 363a, 363b, 363c in series in the axial line x direction and forming the one tube 363. Similarly, the three rotor blade members 306a, 306b, 306c are stacked in the axial line x direction, aligning the respective five blade parts 362a, 362b, 362c in series in the axial line x direction and forming the five blades 362.

In the axial direction (axial line x direction) or the circumferential directions ef of the rotor 3, respective end parts of the blade parts 362a, 362b, 362c oppose the end parts of other blade parts. Specifically, in the axial line x direction or in the circumferential directions ef, the end part of the blade part 362b at the upper side a opposes the end part of the blade part 362a at the lower side b, and the end part of the blade part 362b at the lower side b opposes the end part of the blade part 362c at the upper side a.

By fixing one or all of these opposing end parts of the blade parts 362a, 362b, 362c and the opposing upper and lower end parts of the tubular parts 363a, 363b, 363c by a fixing means (fixing element) such as an adhesive, it is possible to achieve the integrated rotor blade 306. The fixing means (fixing element) is not limited to fixing by an adhesive, and various fixing means (fixing elements) can be employed as appropriate.

In the axial direction (axial line x direction) or circumferential directions ef of the rotor 3, for each of the five blades 362 of the rotor blade 306, one blade 362 and the blade 362 adjacent to this one blade 362 oppose each other. Taking a blade 362-2 in FIG. 20 as a representative of description, a side surface of the blade 362-2 opposes a blade 362-3 adjacent in the clockwise circumferential direction e or the axial line x direction at a lower end 362-2g side. The side surface of the blade 362-2 opposes a blade 362-1 adjacent in the counterclockwise circumferential direction f or the axial line x direction at an upper end 362-2p side.

In the axial line x direction or the circumferential directions ef, each end part of the five blades 362 of the rotor blade 306 is positioned between both end parts of the blade 362 adjacent to that blade 362. Taking a blade 362-1 in FIG. 20 as a representative of description, a lower end 362-1g of blade 362-1 is positioned between both of the end parts 362-2p, 362-2g of the blade 362-2 adjacent in the axial line x direction or the clockwise circumferential direction e of the blade 362-1. Taking a blade 362-3 in FIG. 20 as a representative of description, an upper end 362-3p of the blade 362-3 is positioned between both of the end parts 362-2p, 362-2g of the blade 362-2 adjacent in the axial line x direction or the counterclockwise circumferential direction f of the blade 362-3.

In the axial line x direction, each end part of the five blades 362 of the rotor blade 306 opposes a portion (side surface) between both end parts of the blade 362 adjacent to that blade 362. In other words, portions of the five blades 362 of the rotor blade 306 overlap each other in the axial line x direction. Therefore, the gas passes through the path formed between the side surfaces of two blades 362 adjacent to each other in the axial line x direction or the circumferential directions ef.

In the case of a shape of the circumferential direction of positions of the blades 362 overlapping each other, as with the rotor blade 306 in the present embodiment, molding is relatively difficult. However, in the present embodiment, the rotor blade 306 is divided into three rotor blade members 306a, 306b, 306c. Accordingly, the individual rotor blade members 306a, 306b, 306c have favorable moldability and can be easily molded even with a typical mold. Therefore, by stacking these rotor blade members 306a, 306b, 306c, it is possible to form the rotor blade 306 having a relatively complex shape with ease and at low cost.

An opening angle of each of the blade parts 362a, 362b, 362c of the rotor blade members 306a, 306b, 306c (circumferential angle of the arc between blades parts adjacent to each other on the circumference along the blade part about the axial line x when viewed from one side (upper side a, for example) in the axial line x direction) is 180°/m (where m is a positive integer; the number of blade parts) and, because there are five blade parts (m=5), one opening angle is 36°.

At outer peripheral surfaces of each of the tubular parts 363a, 363b, 363c of the rotor blade members 306a, 306b, 306c, alignment grooves 364 are provided at intervals of a center angle of 36° with half of the alignment grooves 364 coinciding with the locations of the blade parts 362a, 362b, 362c at the inner peripheral side of the upper side a. These alignment grooves 364 are arranged alternately in locations with and locations without the blade parts 362a, 362b, 362c at the inner peripheral side of the upper side a. Then, the three rotor blade members 306a, 306b, 306c are stacked, connecting the blade parts 362a, 362b, 362c to form the blade 362 having a helical shape.

The rotor blade 306 is attached to the outer peripheral surface of the tubular member 32 by fixing the end parts of the five blades 362 at the axial line x side in the radial direction at predetermined positions of the tubular member 32 of the rotor 3 with an adhesive or the like. Accordingly, the rotor blade 306 rotates in the housing 7 with rotation of the rotor 3.

The rotor blade 306 rotates in accordance with the rotation of the rotor 3, and thus rotates together with the rotor 3, generating a flow of a gas in the axial line x direction in accordance with the rotation of the rotor blade 306. This flow of air occurs in either the upward direction or the downward direction of the axial direction of the shaft member 5 in a cavity 377 between the rotor 3 and the housing 7.

As illustrated in FIG. 16, in the rotating device 301 according to the present embodiment, when the rotating device 301 is driven to rotate the rotor blade 306 in the clockwise circumferential direction e, a gas flow occurs in an arrow i direction, and the gas taken in from the lower end opening 76 passes through the cavity 277 and is blown out from the upper end opening 75. On the other hand, when the rotor blade 306 is rotated in the counterclockwise circumferential direction f, a gas flow occurs in an arrow j direction, and the gas taken in from the upper end opening 75 passes through the cavity 277 and is blown out from the lower end opening 76.

The rotating device 301 according to the present embodiment, as in the first embodiment and the second embodiment, can achieve a size reduction of the entire rotating device, supply a strong wind and a large wind volume (large suction volume), stabilize the rotation of the rotor 3, and achieve high rotation and high torque, and thus provide excellent characteristics as a rotating device.

In the present embodiment as well, the coupling members (spacers 381, 382) including the ventilation channel communicating with the inside and the outside of the rotor 3 are disposed between the bearing 4 and the rotor 3, thereby achieving efficient cooling of the stator 2.

As described above, by the rotation of the rotor 3 in the clockwise e direction or the counterclockwise f direction, the rotor blade 306 rotates, generating a gas flow (in the arrow i direction or the arrow j direction) of the air taken in from the lower end opening 76 or the upper end opening 75 passing through the cavity 377 and being blown out from the upper end opening 75 or the lower end opening 76 (refer to FIG. 16).

The rotation of the rotor 3 in the clockwise e direction or the counterclockwise f direction causes the blade members 391, 392 to rotate, and the blades 391c, 392b strengthen the gas flow in the upper side a direction or the lower side b direction in the tubular member 32. As a result, the strong gas flow in the tubular member 32 of the rotor 3 efficiently cools the stator 2 including the heat generation source, such as the coil 22 and the stator core 21.

In particular, the blade members 391, 392 including the blades 391c, 392b are provided at both sides of the upper end opening 75 and the lower end opening 76, and thus a large volume of the gas can be taken into the interior of the rotor 3 and discharged. Thus, the rotating device 301 of the present embodiment can extremely efficiently cool the heat generation source, such as the coil 22 and the stator core 21.

These blade members 391, 392 provided at the top and bottom include the blades 391c, 392b having vertically symmetrical helical shapes, making it possible to reverse the driving of the rotating device 301 to reverse the rotation direction of the rotor 3, and thus generate a gas flow in both the upward and downward directions (arrow i direction and arrow j direction).

The direction of the gas flow (downward direction or upward direction) caused by the rotation of the blade members 391, 392 switched in accordance with the rotation direction of the rotor 3 (clockwise direction e or counterclockwise direction f) is the same as the direction of the gas flow (arrow i direction and arrow j direction) generated by the rotation of the rotor blade 306 similarly switched. Accordingly, the total wind volume can be improved.

As in the second embodiment, the path of the gas flow in the tubular member 32 is free of obstructions to the gas flow other than the cooling targets, and a ventilation port for taking in and discharging the gas does not need to be provided in the tubular member 32. Thus, as in the second embodiment, the heat generation source can be efficiently cooled and the size of the rotating device 301 can be reduced.

In the present embodiment, the rotor blade 306 is fixed in contact with the outer peripheral surface of the tubular member 32 of the rotor 3 at the end parts of the five blades 362 at the axial line x side, making it possible to reduce a region (area) coming into contact with the rotor (rotating body) 3. As a result, a region (area) exposed to the gas at an outer peripheral side surface of the rotor 3 can be increased, making it possible to improve the heat dissipation of the rotor 3.

In the present embodiment, as in the second embodiment, the coupling members (spacers 381, 382) and the blade members 391, 392 generating the gas flow in the tubular member 32 are separated. Therefore, the present embodiment is similar to the second embodiment in a high degree of freedom in the shape of the coupling member, allowing for an enlarged cross-sectional area of the ventilation channel in the coupling member, an improved strength of the coupling member, and a significantly reduced size limitation of the bearing 4 side.

The actions and effects resulting from being able to assemble the rotating device without the blade members are similar to the second embodiment.

In the above, the rotating device according to the present invention has been described with reference to preferred embodiments; however, the rotating device according to the present invention is not limited to the configurations of the embodiments described above. For example, in the embodiments described above, an example of one coupling member being the inner impeller 81 (first embodiment) and an example of the blade members 291, 292 or the blade members 391, 392 being provided at both sides of the upper end opening 75 and the lower end opening 76 (the second embodiment and the third embodiment) have been described; however, the configuration may not include any blades for generating a gas flow for cooling the inside of the rotor.

That is, even with the inner impeller 81 replaced with the spacer 82 in the first embodiment and the blade members 291, 292 or the blade members 391, 392 removed in the second embodiment and the third embodiment, the coupling member including the ventilation channel communicating with the inside and the outside of the rotating body (rotor 3) is included, and thus the actions or the effects of the present invention can be expected.

Even without the blades for generating the gas flow for cooling the inside the rotor, a gas flow occurs. In this gas flow, the air taken in from the lower end opening 76 or the upper end opening 75 passes through the tubular member 32 and is blown out from the upper end opening 75 or the lower end opening 76. Therefore, because a gas flow toward the upper side a or toward the lower side b occurs below the lower end opening 76 and above the upper end opening 75, the gas introduced into this gas flow enters and exits into and out from the rotor 3, even in the ventilation channel of the coupling member not including a blade, and a gas flow in the upper side a direction or the lower side b direction occurs.

In the embodiments described above, an example of a configuration with both upper and lower end parts of the shaft member 5 fixed to the housing 7 is given; however, it is sufficient that at least one end part or a portion of the shaft member 5 be fixed to the housing, as long as the shaft member 5 at the fixed side is fixed to the housing 7 in some manner.

Figure 22:
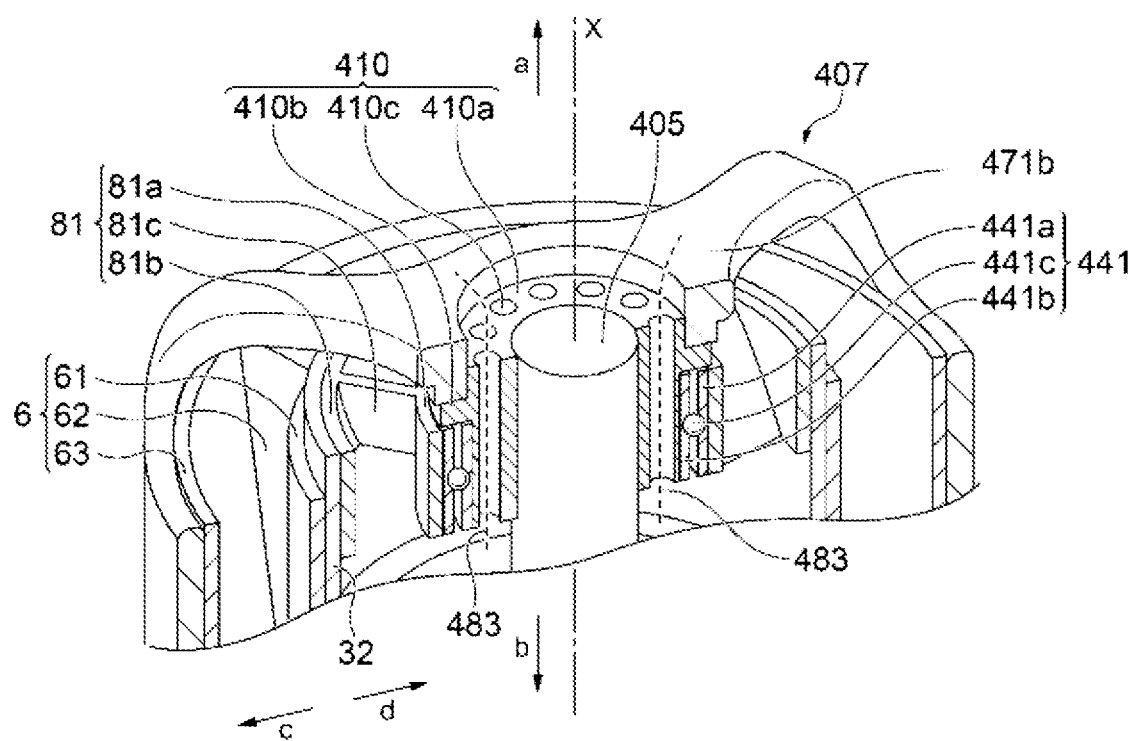
FIG. 22 is an enlarged perspective cross-sectional view of a rotating device according to a modification example of the present invention.
Figure 23:
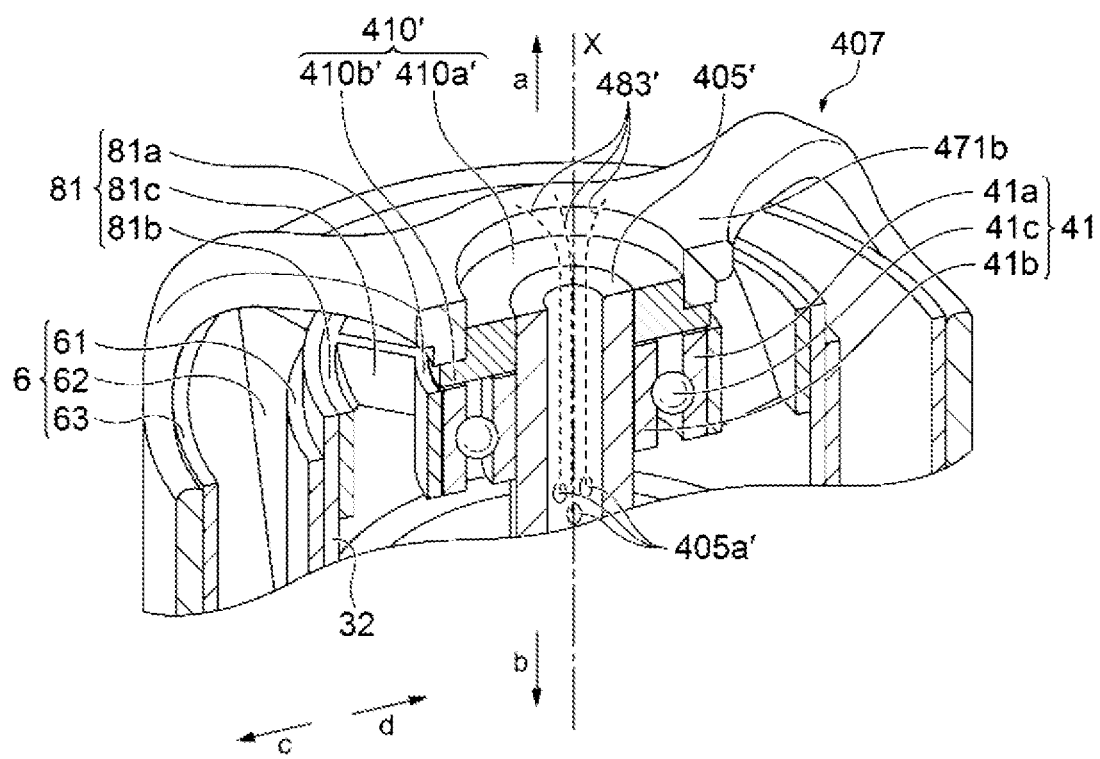
FIG. 23 is an enlarged perspective cross-sectional view of a rotating device according to a modification example of the present invention.
Figure 24:
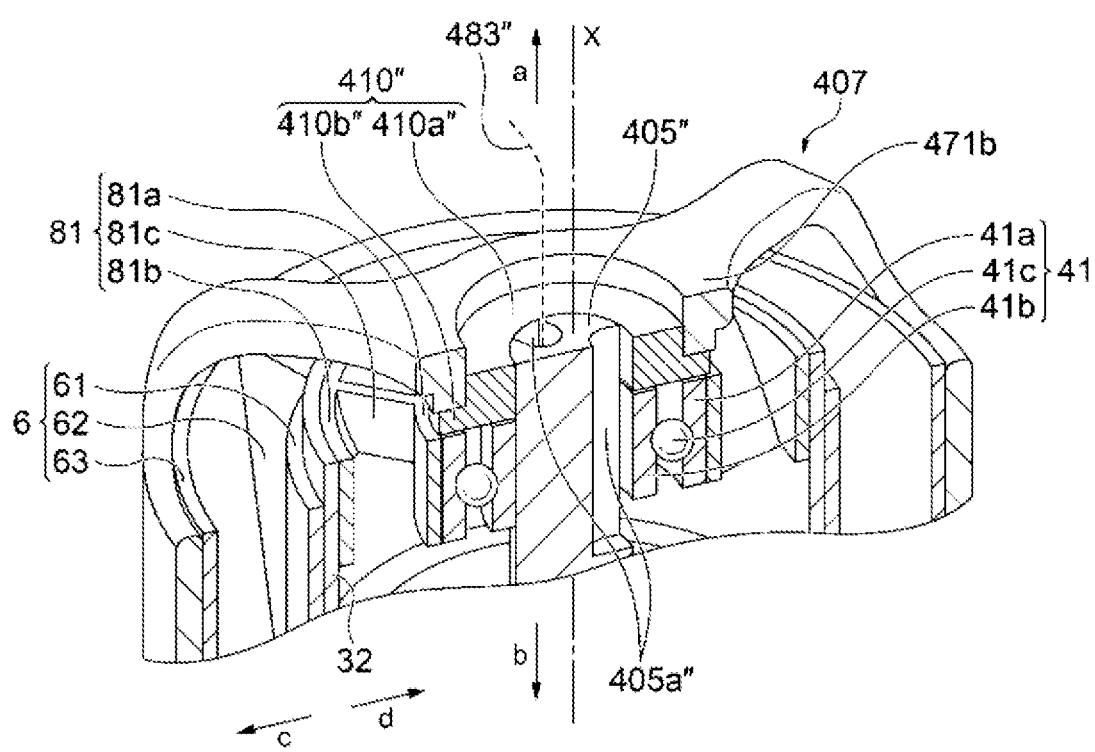
FIG. 24 is an enlarged perspective cross-sectional view of a rotating device according to a modification example of the present invention.

In the embodiments described above, an example of a configuration with the shaft member 5 fixed to the disk part 71*b* of the housing 7 is given; however, in the rotating device of the present invention, a housing 407 and shaft members 405, 405', 405" may be fixed via connection members 410, 410', 410", as in modification examples illustrated in FIGS. 22 to 24. The connection members 410, 410', 410" may be molded with any material such as a resin or aluminum or other metal.

In the modification examples illustrated in FIGS. 22 to 24, the connection members 410, 410', 410" include tubular parts 410*a*, 410*a'*, 410*a"* and flange parts 410*b*, 410*b'*, 410*b"* having an annular shape. Inner peripheral surfaces of the tubular parts 410*a*, 410*a'*, 410*a"* are fixed to outer peripheral surfaces of the shaft members 405, 405', 405" at end parts at the upper side a of the shaft members 405, 405', 405". The flange parts 410*b*, 410*b'*, 410*b"* project from outer peripheral surfaces of the tubular parts 410*a*, 410*a'*, 410*a"* to the outer peripheral side c. Surfaces of the flange parts 410*b*, 410*b'*, 410*b"* at the upper side a are at the lower side b of surfaces of the tubular parts 410*a*, 410*a'*, 410*a"* at the upper side a. In the axial direction of the shaft members 405, 405', 405", portions of the tubular parts 410*a*, 410*a'*, 410*a"* are between the surfaces of the flange parts 410*b*, 410*b'*, 410*b"* at the upper side a and the surfaces of the tubular parts 410*a*, 410*a'*, 410*a"* at the upper side a. An inner peripheral surface of an annular part 471*b* of the housing 407 comes into contact with outer peripheral surfaces of portions of the tubular parts 410*a*, 410*a'*, 410*a"*, and the surfaces of the flange parts 410*b*, 410*b'*, 410*b"* at the upper side a and a surface of the annular part 471*b* of the housing 407 at the lower side b come into contact, engaging and fixing the connection members 410, 410', 410" and the housing 407.

In the modification example illustrated in FIG. 22, in the axial direction, the tubular part 410*a* of the connection member 410 extends to an end part of a first bearing 441 at the lower side b. The tubular part 410*a* is between the shaft member 405 and the first bearing 441 in the radial direction. An inner ring 441*b* of the first bearing 441 is fixed to another portion of the tubular part 410*a* at the lower side b with respect to the flange part 410*b*.

In the tubular part 410*a*, a plurality of through-holes 410*c* having a circular shape and penetrating in the axial direction is lined in the circumferential direction at an equal interval. Each of the plurality of through-holes 410*c* extends from an end part of the tubular part 410*a* at the upper side a to an end part of the tubular part 410*a* at the lower side b in the axial direction. In the modification example illustrated in FIG. 22, a plurality of (for example, three) lead wires 483 connected to the coil 22 is drawn to the outside of the rotating device through one or more of the through-holes 410*c*.

In the modification example illustrated in FIG. 23, a surface of the tubular part 410*a'* of the connection member 410' at the lower side b and a surface of the flange part 410*b'* at the lower side b form a plane. In the axial direction of the shaft member 405', the surface of the tubular part 410*a'* at the lower side b and the surface of the flange part 410*b'* at the lower side b oppose the surface of the first bearing 41 at the upper side a, and are separated by a predetermined interval from the surface of the first bearing 41 at the upper side a.

The shaft member 405' is partially or entirely hollow in the axial direction, and is open at the upper side a. In the shaft member 405', a plurality (for example, three) openings 405*a'* are provided at the lower side b of the first bearing 41 in the axial direction. Only one opening 405*a'* may be provided. In the modification example illustrated in FIG. 23, a plurality (for example, three) of lead wires 483' connected to the coil 22 are configured to be drawn from the openings 405a' into the interior of the shaft member 405' and drawn from the end opening of the shaft member 405' to the outside of the rotating device.

In the modification example illustrated in FIG. 24, a surface of the tubular part 410a" of the connection member 410" at the lower side b and a surface of the flange part 410b" at the lower side b form a plane. In the axial direction of the shaft members 405, 405', 405", the surface of the tubular part 410a' at the lower side b and the surface of the flange part 410b' at the lower side b oppose the surface of the first bearing 41 at the upper side a, and are separated by a predetermined interval from the surface of the first bearing 41 at the upper side a.

In the outer peripheral surface of the shaft member 405", a plurality of (for example, three) recessed parts 405a" extending linearly from an end part at the upper side a to the lower side b in the axial direction are formed radially at an equal interval. Each recessed part 405a" extends to the lower side b of the first bearing 41. Only one recessed part 405a" may be provided. In the modification example illustrated in FIG. 24, a plurality of (for example, three) lead wires 483" connected to the coil 22 are configured to be drawn to the outside of the rotating device through one or more of the recessed parts 405a".

According to the modification examples illustrated in FIGS. 22 to 24, the lead wires can be drawn out without difficulty from inside the rotating device while keeping the number of components at a minimum.

In the modification examples illustrated in FIGS. 22 to 24, an example of a configuration with the connection members 410, 410', 410" being provided at the end part of the rotating device at the upper side a is given; however, the connection members 410, 410', 410" may be provided at the end parts of the rotating device at the lower side b or may be provided at both end parts. In the modification example illustrated in FIG. 23, an example of a configuration with the shaft member 405a being open at the upper side a is given; however, the shaft member 405' may be open at the lower side b. Further, in the modification example illustrated in FIG. 24, an example of a configuration with the recessed part 405a" extending from the end part of the shaft member 405" at the upper side a to the lower side b in the axial direction is given; however, the recessed part 405a" may be formed extending from the end part of the shaft member 405" at the lower side b to the upper side a. That is, in the modification examples illustrated in FIGS. 22 to 24, an example of a configuration with the lead wires being drawn from the upper side a of the rotating device is given; however, a configuration with the lead wires being drawn out from the lower side b of the rotating device may be adopted.

Figure 25:
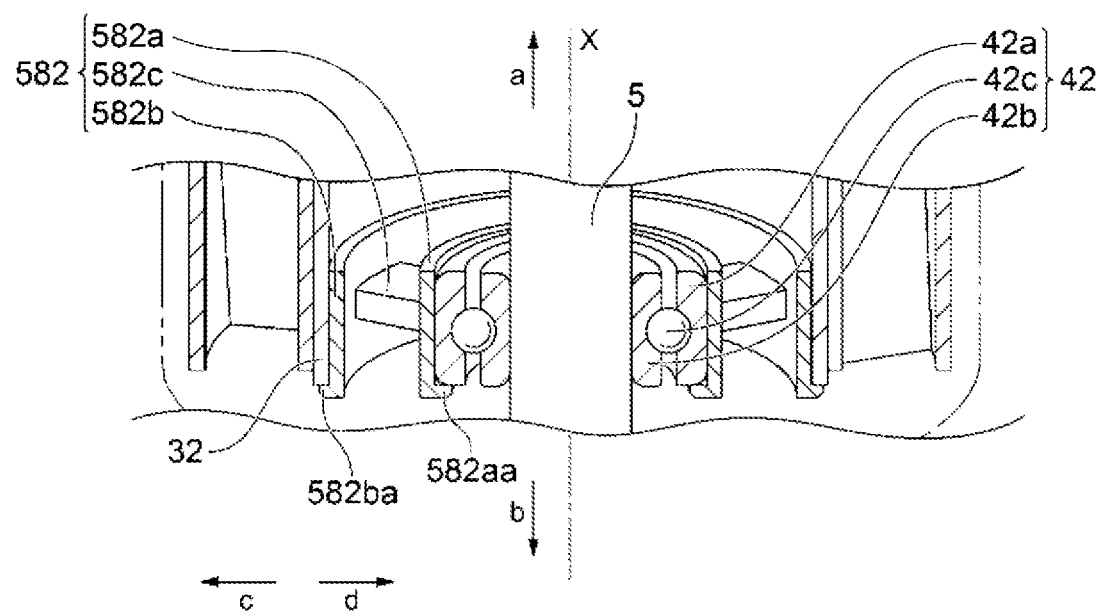
FIG. 25 is an enlarged cross-sectional view of a rotating device according to a modification example of the present invention.

In the first embodiment, an example of a configuration with both the inner ring part 82a and the outer ring part 82b of the spacer 82 having a cylindrical shape is given; however, as in the modification example illustrated in FIG. 25, in the rotating device of the present invention, an inner ring part 582a of a spacer 582 may include, at an end part at the lower side b, a projecting part 582aa having an annular shape and projecting to the inner peripheral side d. An outer ring part 582b of the spacer 582 may include, at the end part of the lower side b, a projecting part 582ba having an annular shape and projecting to the outer peripheral side c. Here, the projecting part 582aa engages with an end part of the inner ring 42b of the second bearing 42 at the lower side b in the axial direction, and the projecting part 582ba engages with the end part of the tubular member 32 at the lower side b in the axial direction.

According to the modification example illustrated in FIG. 25, the projecting part 582aa and the projecting part 582ba are stoppers, facilitating the positioning of the spacer 582, the rotor 3, and the second bearing 42. Further, misalignment caused by the spacer 582, the rotor 3, and the second bearing 42 mutually sliding in the axial direction can be prevented.

In the modification example illustrated in FIG. 25, an example of a configuration with the projecting parts provided at the inner peripheral side d and the outer peripheral side c at the end part at the lower side b of the coupling member at the lower side b is given; however, the projecting parts may be provided at the inner peripheral side d and the outer peripheral side c at the end part of the upper side a of the coupling member at the upper side a, or both may be provided. The coupling member including the projecting part may be a spacer, or may be an inner impeller.

In the embodiments described above, the blowers or intake devices provided with the rotor blades 6, 206, 306 are given as examples; however, the rotating device of the present invention may use the rotational force for purposes other than rotation of the rotor blade. In this case, the rotor blade is not required, and a transmission mechanism such as a gear or a shaft for transmitting the rotational force to an intended target may be provided, or the rotating body may be configured to act directly on the intended target.

The rotating device of the embodiments described above may use a liquid, such as water or oil, instead of a gas. Therefore, in the rotating device in the embodiments described above, fluid including a gas or a liquid can be applied.

In addition, the rotating device according to the present invention may be appropriately modified by a person skilled in the art according to conventionally known knowledge. Such modifications are of course included in the scope of the present invention as long as these modifications still include the configuration of the present invention.

REFERENCE SIGNS LIST

1 Rotating device; 2 Stator; 3 Rotor (rotating body); 4 Bearing; 5 Shaft member; 6 Rotor blade; 7 Housing; 21 Stator core; 22 Coil; 23 Magnetic pole part; 24 Annular part; 31 Magnet; 32 Tubular member; 41 First bearing (bearing); 41a, 42a Outer ring; 41b, 42b Inner ring; 41c, 42c Bearing ball; 42 Second bearing (bearing); 61 Inner tube; 62 Blade; 63 Outer tube; 64 Cavity; 71a Spoke part; 71b Disk part; 72 Tubular part; 77 Space; 81 Inner impeller (coupling member); 81a, 82a Inner ring part; 81b, 82b Outer ring part; 81c Blade; 82 Spacer (coupling member); 82c Spoke; 201 Rotating device; 206 Rotor blade; 261a, 261b, 261c Fixing part; 262 Blade; 277 Cavity; 281, 282 Spacer (coupling member); 281a, 282a Inner ring part; 281b, 282b Outer ring part; 281c, 282c Spoke; 291 Blade member; 291a Ring part; 291b Blade; 291c Projecting part; 292 Blade member; 292a Ring part; 292b Blade; 292c Projecting part; 301 Rotating device; 306 Rotor blade; 306a, 306b, 306c Rotor blade member; 362, 362-1, 362-2, 362-3 Blade; 362a, 362b, 362c Blade part; 362-1g, 362-2g Lower end; 362-2p, 362-3p Upper end; 363 Tube; 363a, 363b, 363c Tubular part; 364 Alignment groove; 377 Cavity; 381, 382 Spacer (coupling member); 381a, 382a Inner ring part; 381b, 382b Outer ring part; 381c, 382c Base; 381d, 382d Base; 391 Blade member; 391a Inner ring part; 391b Outer ring part; 391c Blade; 391d Cavity; 391e Conical tubular part; 391f Cylindrical projecting part; 391g Bottom; 391h Cylindrical projecting part; 391i Conical tubular part; 391*k* Notch; 392 Blade member; 392*a* Ring part; 392*b* Outer ring part; 392*c* Blade; 392*d* Cavity; 392*e* Conical tubular part; 392*f* Cylindrical projecting part; 392*g* Bottom; 392*h* Cylindrical projecting part; 392*i* Conical tubular part; 392*k* Notch; 405, 405', 405" Shaft member; 405*a* Opening; 405*a"* Recessed part; 407 Housing; 410, 410', 410" Connection member; 410*a*, 410*a'*, 410*a"* Tubular part; 410*b*, 410*b'*, 410*b"* Flange part; 410*c* Through-hole; 441 First bearing (bearing); 441*a* Outer ring; 441*b* Inner ring; 441*c* Bearing ball; 471*b* Annular part; 483, 483', 483" Lead wire; 582 Spacer (coupling member); 582*a* Inner ring part; 582*b* Outer ring part; 582*c* Spoke; 582*aa*, 582*ba* Projecting part

The invention claimed is:

1. A rotating device, comprising:
a shaft member;
a rotating body having a tubular shape and rotatable about the shaft member;
a bearing supporting the rotating body with respect to the shaft member; and
a coupling member disposed between the bearing and the rotating body in a radial direction, and
a blade member adjacent to the coupling member in an axial direction and including a plurality of blades, wherein
the blade of the blade member is inclined,
the coupling member includes a ventilation channel communicating with an inside and an outside of the rotating body,
the blade member includes a projecting part projecting toward a side of the coupling member, and
the projecting part fits into the coupling member.

2. The rotating device according to claim 1, comprising:
a housing having a tubular shape surrounding the rotating body; and
a stator inside the rotating body.

3. The rotating device according to claim 1, wherein
the coupling member includes a plurality of blades, and
the plurality of blades is oriented in a direction inclined with respect to an axial direction of the shaft member.

4. The rotating device according to claim 3, comprising
bearings including the bearing, and
coupling members including the coupling member, wherein
the bearings are provided at end parts of the rotating body or near the end parts of the rotating body in the axial direction of the shaft member,
the coupling members are disposed between the bearings and the rotating body,
one of the coupling member includes the blades.

5. The rotating device according to claim 4, wherein the other of the coupling members includes a plurality of spokes extending inward and outward in the radial direction.

6. The rotating device according to claim 1, wherein
a gas can flow inside the rotating body in the axial direction, and
the coupling member at a discharge port side of the gas includes the blades.

7. The rotating device according to claim 1, wherein the blade of the blade member is oriented in a direction inclined with respect to an axial direction of the shaft member.

8. The rotating device according to claim 1, wherein the coupling member includes a plurality of spokes extending inward and outward in the radial direction.

9. The rotating device according to claim 8, wherein
a gas can flow inside the rotating body in the axial direction, and
the blade member is provided at an outer side of the coupling member at a discharge port side of the gas in the axial direction of the rotating body.

10. The rotating device according to claim 1, wherein a rotor blade is provided at an outer peripheral surface of the rotating body.

11. The rotating device according to claim 10, wherein
the rotor blade includes a plurality of blades each including a plurality of blade parts lined in the axial direction of the rotating body, and
each of the plurality of blades of the rotor blade opposes a blade adjacent to each of the plurality of blades of the rotor blade in a circumferential direction of the rotating body.

12. The rotating device according to claim 11, wherein an end part of each of the plurality of blades of the rotor blade is positioned between both end parts of the blade adjacent to each of the plurality of blades of the rotor blade in the circumferential direction of the rotating body.

13. The rotating device according to claim 1, wherein
the bearings are provided at a end part of the rotating body or the end part of the rotating body in an axial direction of the rotating body,
the coupling members are disposed between the bearings and the rotating body, and the blade member is provided at an outer side of one of the coupling members in the axial direction of the rotating body.

14. A rotating device, comprising:
a shaft member;
a rotating body having a tubular shape and rotatable about the shaft member;
a bearing supporting the rotating body with respect to the shaft member;
a coupling member disposed between the bearing and the rotating body in a radial direction; and
a blade member adjacent to the coupling member in an axial direction and including a plurality of blades, wherein
the coupling member includes a first ventilation channel communicating with an inside and an outside of the rotating body,
the blade member includes a second ventilation channel connected to the ventilation channel of the coupling member,
a gas can flow inside the rotating body in both directions of axial direction, and
the coupling member includes a base opposing the blade of the blade member in an axial direction of the shaft member.

15. The rotating device according to claim 14, wherein a hole part serving as the first ventilation channel is formed in the base.

* * * * *